US011982270B2

(12) United States Patent
Ino

(10) Patent No.: US 11,982,270 B2
(45) Date of Patent: May 14, 2024

(54) PUMP DEVICE

(71) Applicant: MIKUNI CORPORATION, Tokyo (JP)

(72) Inventor: Yasuhiro Ino, Iwate (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 18/298,361

(22) Filed: Apr. 10, 2023

(65) Prior Publication Data

US 2023/0417243 A1 Dec. 28, 2023

(30) Foreign Application Priority Data

Jun. 22, 2022 (JP) ................................ 2022-100652

(51) Int. Cl.

| | |
|---|---|
| ***F04C 14/26*** | (2006.01) |
| ***F04C 2/10*** | (2006.01) |
| ***F04C 11/00*** | (2006.01) |
| ***F04C 15/00*** | (2006.01) |
| ***F04C 15/06*** | (2006.01) |
| ***F04C 29/12*** | (2006.01) |
| *F04C 2/08* | (2006.01) |

(52) U.S. Cl.

CPC ............ *F04C 11/001* (2013.01); *F04C 2/102* (2013.01); *F04C 15/0057* (2013.01); *F04C 15/06* (2013.01); *F04C 2/084* (2013.01); *F04C 2240/30* (2013.01); *F04C 2240/805* (2013.01); *F05C 2201/0439* (2013.01); *F05C 2201/0448* (2013.01); *F05C 2201/903* (2013.01)

(58) Field of Classification Search

CPC ........ F04C 11/001; F04C 2/102; F04C 15/06; F04C 14/26

See application file for complete search history.

(56) References Cited

U.S. PATENT DOCUMENTS 6,386,836 B1 * 5/2002 Johnson ............ F16H 61/66272 417/310
6,679,692 B1 * 1/2004 Feuling ................. F04C 11/001 418/200

FOREIGN PATENT DOCUMENTS

JP 2006161616 6/2006
JP 2008163925 7/2008
JP 2015178826 A * 10/2015 .............. F01C 21/10

OTHER PUBLICATIONS

English JP2015178826 by PE2E Jul. 28, 2023.*

* cited by examiner

*Primary Examiner* — Deming Wan
(74) *Attorney, Agent, or Firm* — JCIPRNET

(57) ABSTRACT

The pump device includes a housing defining insertion holes for a rotation shaft, inlets and outlets, and an internal passage; a first pump element; and a second pump element. The internal passage includes first suction passages communicating from the inlet to a first suction port facing the first end surface of the first pump element directed to one end side; first discharge passages communicating from a first discharge port facing the first end surface to the outlet; second suction passages passing around the first pump element to communicate from the inlet to a second suction port facing the second end surface of the second pump element; and second discharge passages passing around the first pump element to communicate from a second discharge port facing the second end surface to the outlet.

10 Claims, 19 Drawing Sheets

PUMP DEVICE

CROSS-REFERENCE TO RELATED APPLICATION

This application claims the priority benefits of Japanese application no. 2022-100652, filed on Jun. 22, 2022. The entirety of the above-mentioned patent application is hereby incorporated by reference herein and made a part of this specification.

BACKGROUND

Technical Field

The disclosure relates to a pump device including rotor-type pump elements that perform pumping operations of sucking, pressurizing, and discharging a fluid, and particularly relates to a pump device including two pump elements that are arranged in an axial direction of a rotation shaft and perform pumping operations independently in parallel.

Description of Related Art

A tandem-type trochoid pump has been known as a conventional pump device, which includes a rotation shaft that rotates around an axis, a bottomed cylindrical pump body that rotatably supports the rotation shaft, a cover member that closes an opening of the pump body, a first pump element and a second pump element that are disposed in a rotor housing chamber of the pump body and arranged in an axial direction, a suction passage that is formed radially outside the rotor housing chamber over the entire area in the axial direction to introduce oil into the first pump element and the second pump element, and a discharge passage that is formed radially outside the rotor housing chamber over the entire area in the axial direction to lead out the oil pressurized and discharged from the first pump element and the second pump element (see, for example, Patent Literature 1 (Japanese Patent Laid-Open No. 2008-163925) and Patent Literature 2 (Japanese Patent Laid-Open No. 2006-161616)).

Since the suction passage and the discharge passage in this tandem-type trochoid pump are formed over the entire area in the axial direction around the radially outer side of two pump elements, the outer diameter of the pump body increases, which results in an increase in size as a whole. In addition, although the first pump element and the second pump element are divided with a partition member interposed therebetween, the oil is sucked up in regions adjacent to each other through suction grooves provided in the partition member so there is particularly a concern that local wear of the bearing at a high rotation speed may be accelerated.

Moreover, since the rotational axis of a first outer rotor of the first pump element and the rotational axis of a second outer rotor of the second pump element are biased to the same side with respect to the axis of the rotation shaft, the discharge pressure is applied to the same side of the rotation shaft, and there is a concern about uneven wear of the bearing region that receives the rotation shaft. Further, in the arrangement configuration in which both rotational axes are biased to the same side, if the suction passage and the discharge passage of the first pump element and the suction passage and the discharge passage of the second pump element are disposed separately and independently, it is necessary to dispose the passages side by side on the radially outer side in order to avoid mutual interference, which results in an increase in the size of the pump body.

SUMMARY

In view of the above circumstances, the disclosure provides a pump device that is structurally simple and compact and has improved functional reliability.

A pump device according to an embodiment of the disclosure includes a housing defining an insertion hole through which a rotation shaft that rotates around a predetermined axis is inserted, inlets and outlets for a fluid which open on one end side in an axial direction of the axis, and an internal passage through which the fluid passes; and a first pump element arranged near the one end side and a second pump element disposed adjacent to the first pump element so as to be rotationally driven by the rotation shaft within the housing. The internal passage includes a first suction passage communicating from the inlet to a first suction port facing a first end surface of the first pump element directed to the one end side, a first discharge passage communicating from a first discharge port facing the first end surface to the outlet, a second suction passage passing around the first pump element to communicate from the inlet to a second suction port facing a second end surface of the second pump element, and a second discharge passage passing around the first pump element to communicate from a second discharge port facing the second end surface to the outlet.

In the above pump device, the second end surface of the second pump element may be an end surface directed to the other end side opposite to the one end side in the axial direction, the second suction passage may pass around the second pump element to communicate with the second suction port, and the second discharge passage may pass around the second pump element to communicate with the second discharge port.

In the above pump device, the inlets may include a first inlet and a second inlet, the outlets may include a first outlet and a second outlet, the first suction passage may communicate from the first inlet to the first suction port, the first discharge passage may communicate from the first discharge port to the first outlet, the second suction passage may communicate from the second inlet to the second suction port, and the second discharge passage may communicate from the second discharge port to the second outlet.

In the above pump device, the housing may include a passage member which defines the one end side and includes the inlet and the outlet, a first housing member which is connected to the passage member to house the first pump element, and a second housing member which is connected to the first housing member to house the second pump element.

In the above pump device, the passage member may include the first suction port, the first discharge port, a part of the first suction passage, a part of the first discharge passage, a part of the second suction passage, and a part of the second discharge passage; the first housing member may include the insertion hole, a blocking wall that blocks between the first pump element and the second pump element, a part of the second suction passage, and a part of the second discharge passage; and the second housing member may include the insertion hole, the second suction port, the second discharge port, a part of the second suction passage, and a part of the second discharge passage.

In the above pump device, the passage member may include an outer member that is joined to an applicable object, and an intervening member that is interposed between the outer member and the first housing member.

In the above pump device, the outer member may include the inlet, the outlet, a part of the first suction passage, a part of the first discharge passage, a part of the second suction passage, and a part of the second discharge passage; the intervening member may include the first suction port, the first discharge port, a part of the second suction passage, and a part of the second discharge passage; the first housing member may include the insertion hole, a blocking wall that blocks between the first pump element and the second pump element, a part of the second suction passage, and a part of the second discharge passage; and the second housing member may include the insertion hole, the second suction port, the second discharge port, a part of the second suction passage, and a part of the second discharge passage.

In the above pump device, the intervening member may include a part of the first suction passage and a part of the first discharge passage.

In the above pump device, the first housing member and the second housing member may be formed into bottomed cylindrical shapes having the same outer diameter and defining the insertion hole.

In the above pump device, the first pump element and the second pump element may have the same shape.

In the above pump device, the first pump element may include a first inner rotor that rotates around the axis, and a first outer rotor that rotates around a first biased axis which is parallel to the axis in conjunction with the first inner rotor; and the second pump element may include a second inner rotor that rotates around the axis, and a second outer rotor that rotates around a second biased axis which is parallel to the axis in conjunction with the second inner rotor.

In the above pump device, the first biased axis and the second biased axis may be arranged 180 degrees apart around the axis.

The pump device having the above configuration is structurally simple and compact and has improved functional reliability.

DESCRIPTION OF THE EMBODIMENTS

Hereinafter, embodiments of the disclosure will be described with reference to the accompanying drawings. The pump device according to the disclosure is applied to supply, for example, lubricating, operating, or cooling oil as a fluid to, for example, a sliding part, drive system, or functional part of an engine as an applicable object.

Figure 1:
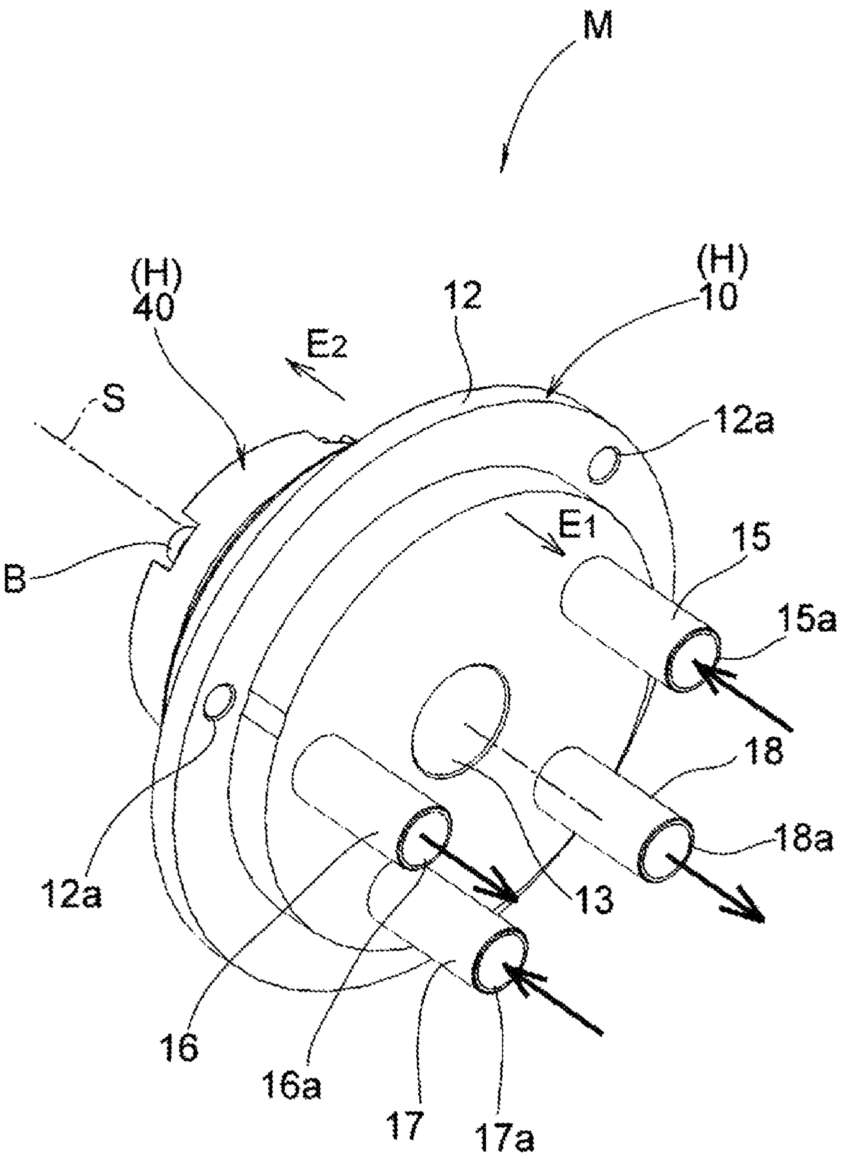
FIG. 1 shows the pump device according to an embodiment of the disclosure, and is an external perspective view seen from one end side of the housing.
Figure 2:
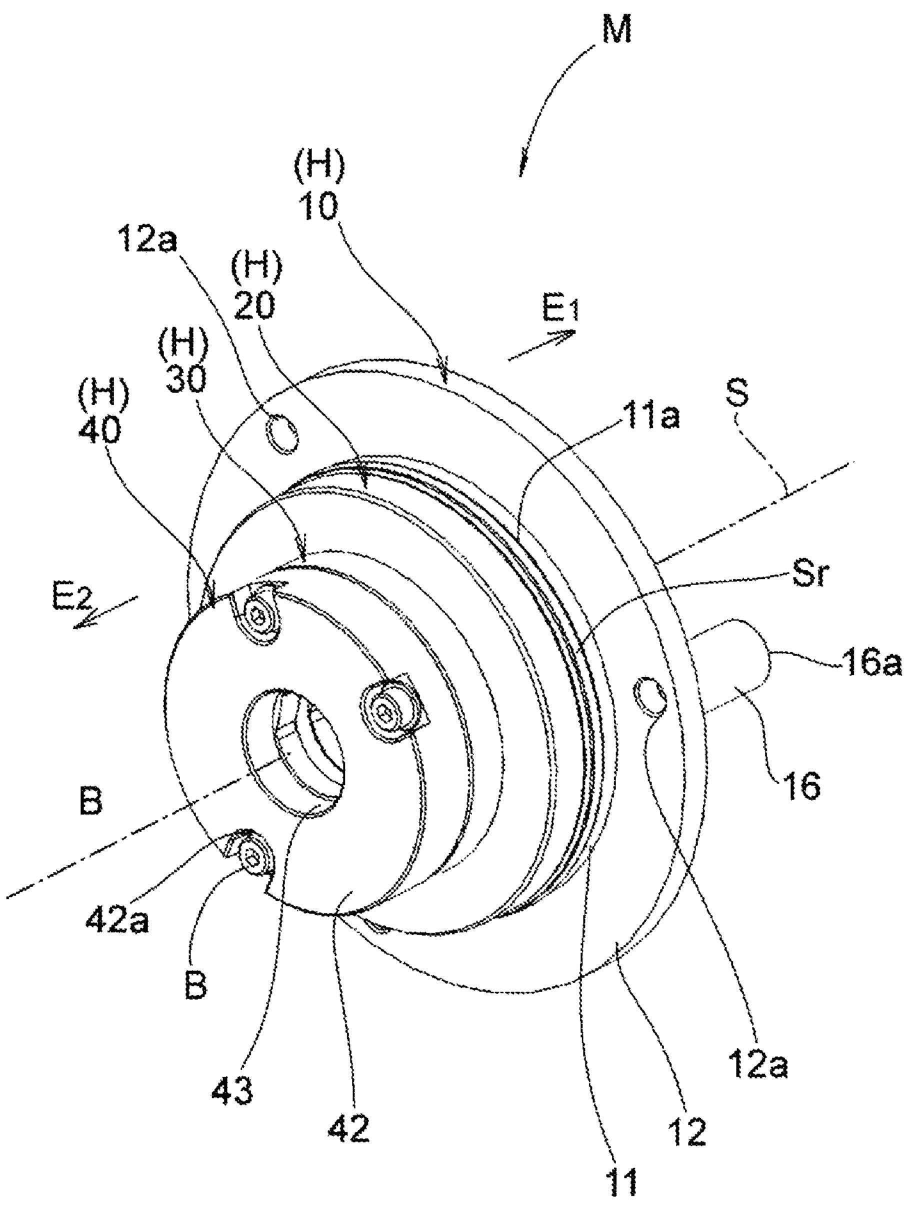
FIG. 2 shows the pump device according to an embodiment, and is an external perspective view seen from the other end side of the housing.
Figure 3:
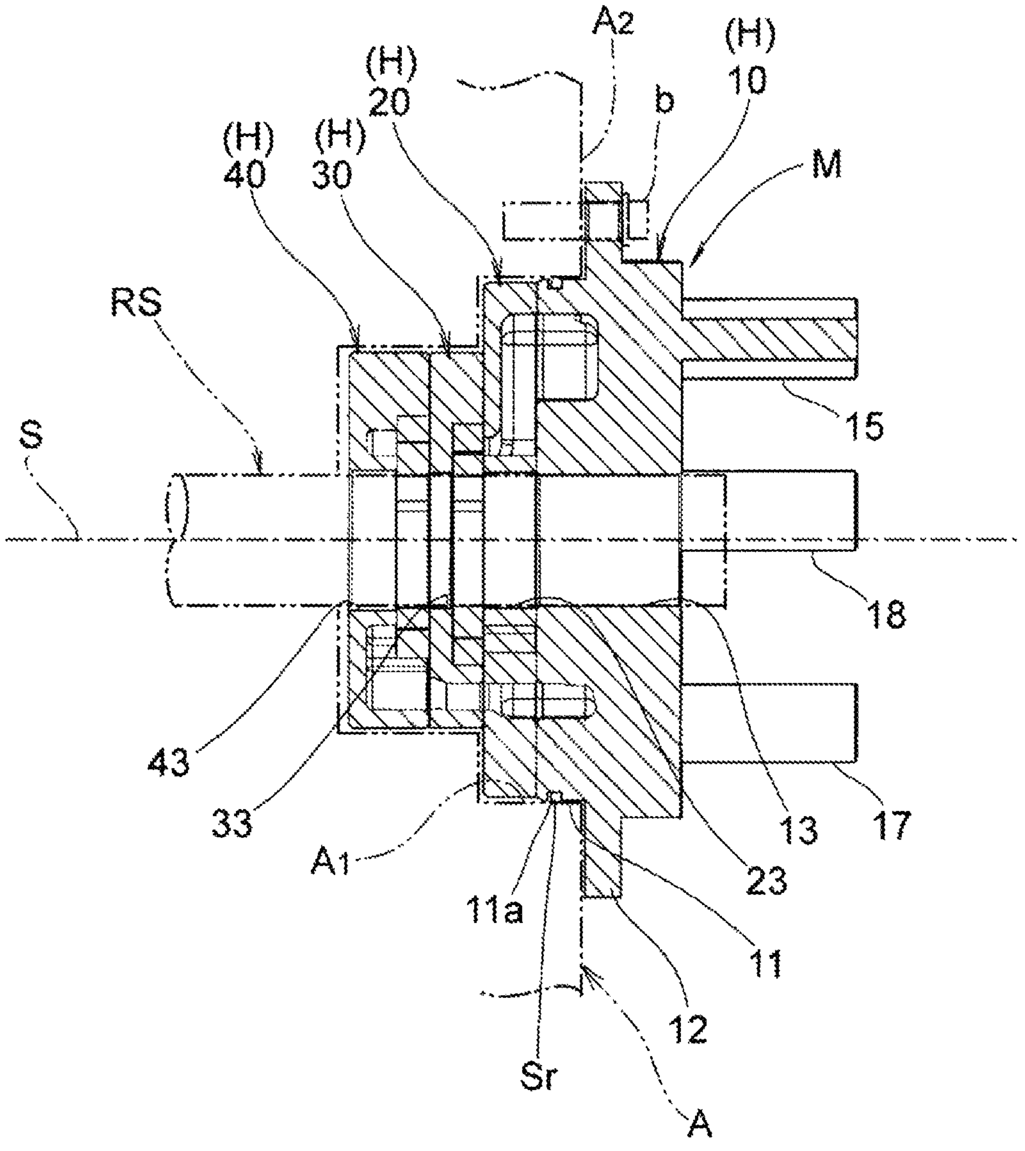
FIG. 3 is a cross-sectional view showing a state where the pump device according to an embodiment is attached to the applicable object.

As shown in FIG. 1 to FIG. 5, the pump device M according to an embodiment includes an outer member 10, an intervening member 20, a first housing member 30, a second housing member 40, a first pump element 50, a second pump element 60, three bolts B for fastening, six positioning pins $P_1$, $P_2$, and $P_3$, and a sealing member Sr. The positioning pins $P_1$, $P_2$, and $P_3$ are all the same. Here, a housing H is configured by the outer member 10, the intervening member 20, the first housing member 30, and the second housing member 40. Further, as shown in FIG. 3, a passage member is configured by the outer member 10 joined to an applicable object A, and the intervening member

20 interposed between the outer member 10 and the first housing member 30. Furthermore, the pump device M is built in the applicable object A and is rotationally driven by a rotation shaft RS, which is included in the applicable object A and rotates around an axis S, to perform pumping operations.

The outer member 10 is positioned on one end side $E_1$ of the housing H and is formed in a substantially disk shape using a metal material such as steel, cast iron, sintered steel, and aluminum alloy, and as shown in FIG. 1 to FIG. 4, includes a fitting portion 11, a flange portion 12, an insertion hole 13, a joint surface 14, a first suction pipe 15, a first discharge pipe 16, a second suction pipe 17, and a second discharge pipe 18.

Figure 4:
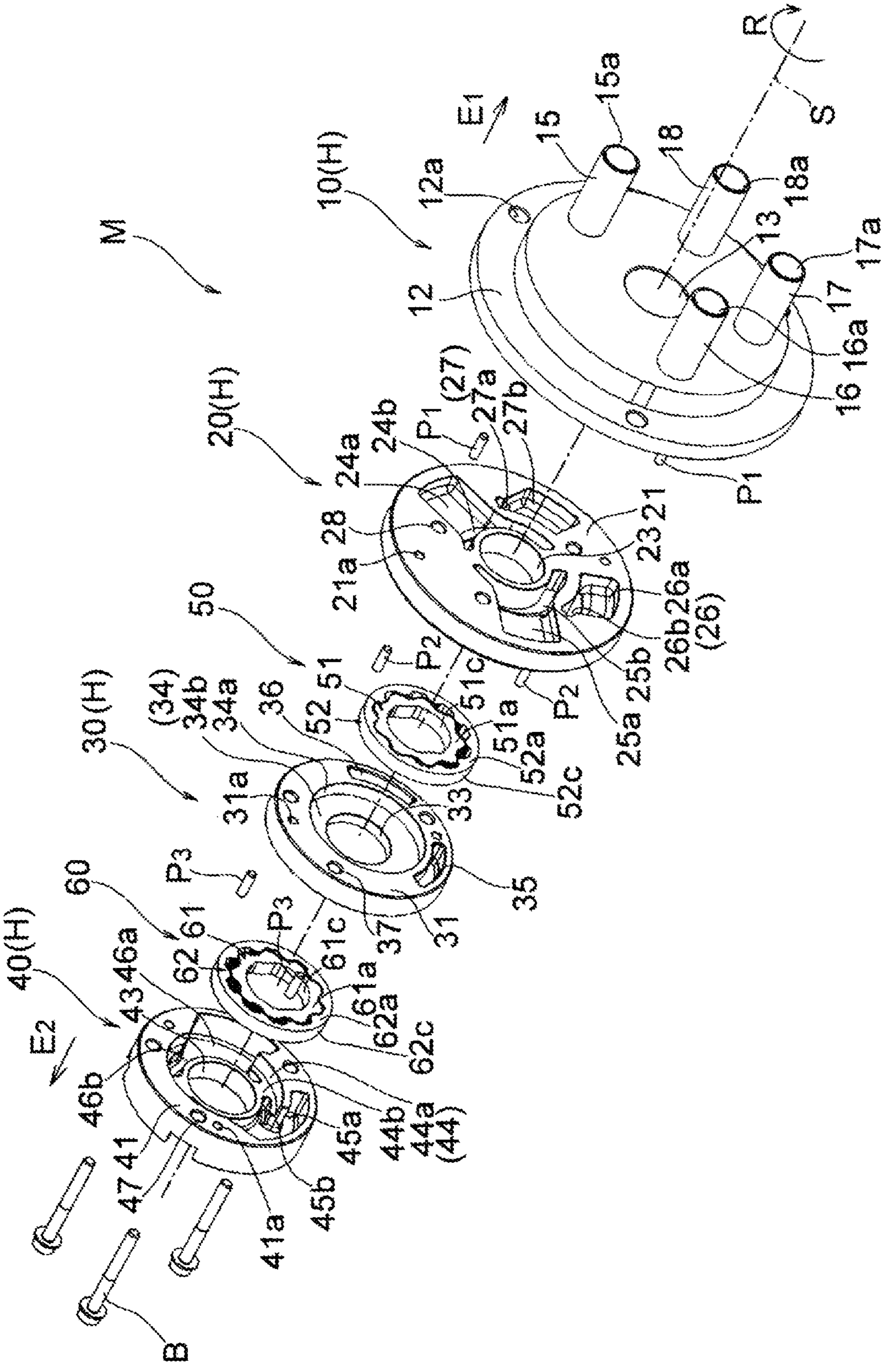
FIG. 4 is an exploded perspective view of the pump device according to an embodiment seen from one end side of the housing.
Figure 5:
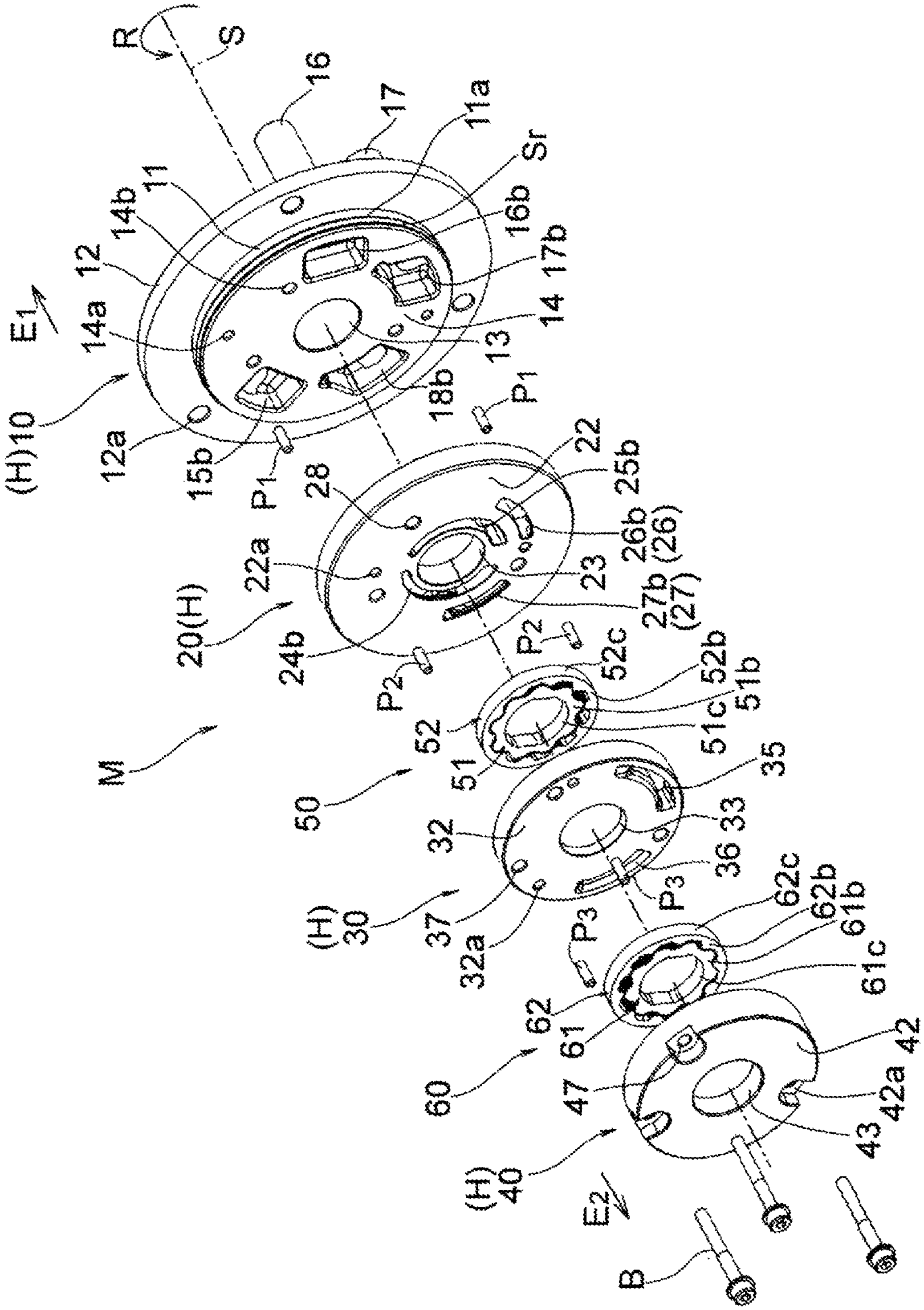
FIG. 5 is an exploded perspective view of the pump device according to an embodiment seen from the other end side of the housing.
Figure 6:
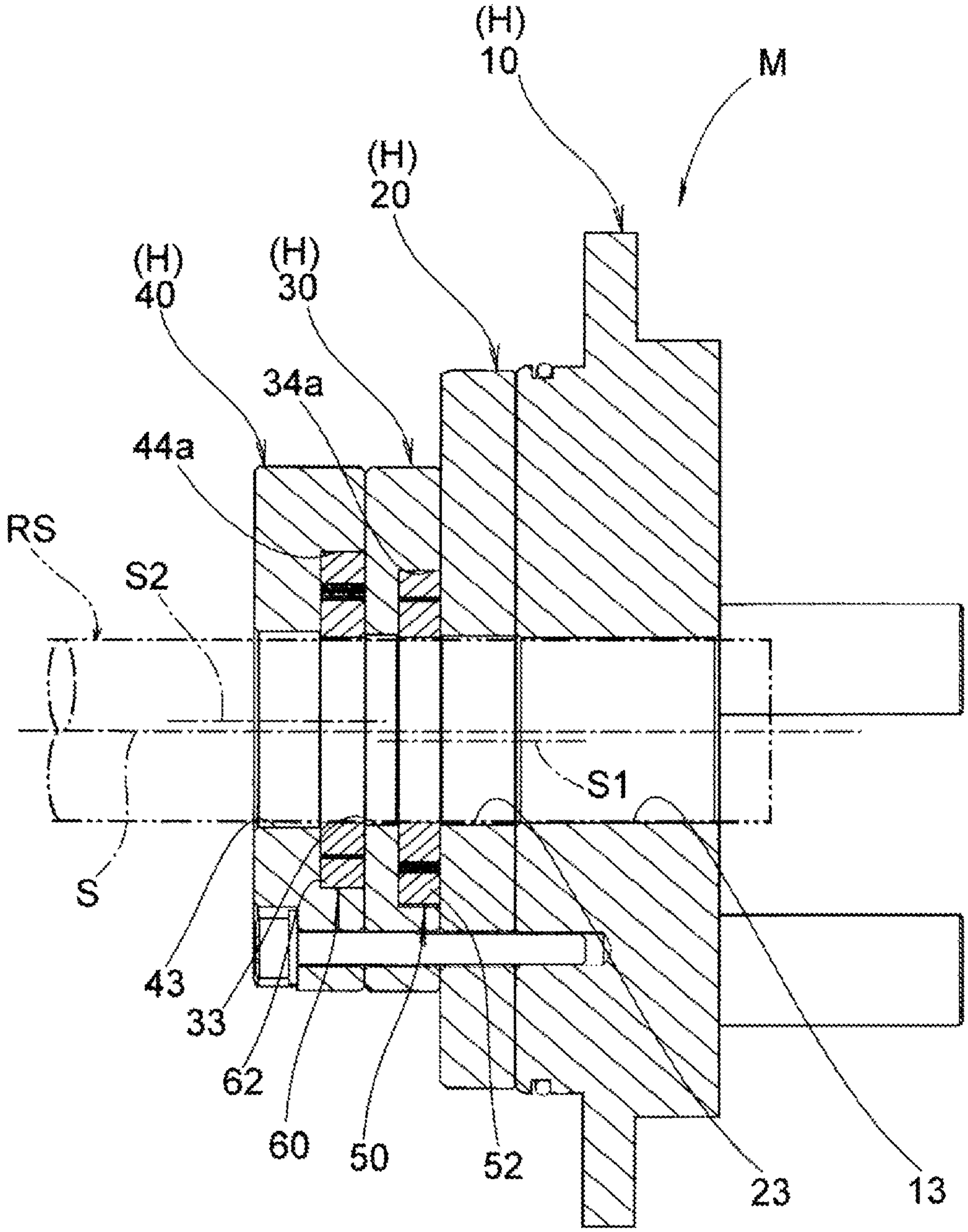
FIG. 6 is a cross-sectional view taken along a plane including the axis of the rotation shaft, the first biased axis of the first pump element, and the second biased axis of the second pump element in the pump device according to an embodiment.

As shown in FIG. 3, the fitting portion 11 is formed in a columnar shape to be fitted into a recess $A_1$ of the applicable object A, and includes an annular groove 11*a* for fitting the sealing member Sr on the outer peripheral surface. The flange portion 12 includes three circular holes 12*a* through which screws b pass so that the flange portion 12 is joined to an end surface $A_2$ of the applicable object A and fastened and fixed by the screws b. The insertion hole 13 functions as a bearing hole through which the rotation shaft RS passes and which supports an end thereof. As shown in FIG. 4 and FIG. 5, the joint surface 14 is formed as a circular flat surface perpendicular to the axis S to be joined to a joint surface 21 of the intervening member 20, and includes two positioning holes 14*a* for fitting the positioning pins $P_1$ and three screw holes 14*b* for screwing the bolts B.

The first suction pipe 15 defines a first inlet 15*a* at a tip thereof. In addition, a first suction passage 15*b*, which includes a passage in the first suction pipe 15 and opens from the first inlet 15*a* to the joint surface 14, is defined. The first discharge pipe 16 defines a first outlet 16*a* at a tip thereof. In addition, a first discharge passage 16*b*, which includes a passage in the first discharge pipe 16 and opens from the first outlet 16*a* to the joint surface 14, is defined. The second suction pipe 17 defines a second inlet 17*a* at a tip thereof. In addition, a second suction passage 17*b*, which includes a passage in the second suction pipe 17 and opens from the second inlet 17*a* to the joint surface 14, is defined. The second discharge pipe 18 defines a second outlet 18*a* at a tip thereof. In addition, a second discharge passage 18*b*, which includes a passage in the second discharge pipe 18 and opens from the second outlet 18*a* to the joint surface 14, is defined.

Here, the first suction passage 15*b*, the first discharge passage 16*b*, the second suction passage 17*b*, and the second discharge passage 18*b* function as the internal passages defined by the housing H. In addition, the first inlet 15*a* and the second inlet 17*a* serving as inlets, and the first outlet 16*a* and the second outlet 18*a* serving as outlets are formed to open on one end side $E_1$ of the housing H (outer member 10) in the direction of the axis S.

Figure 8:
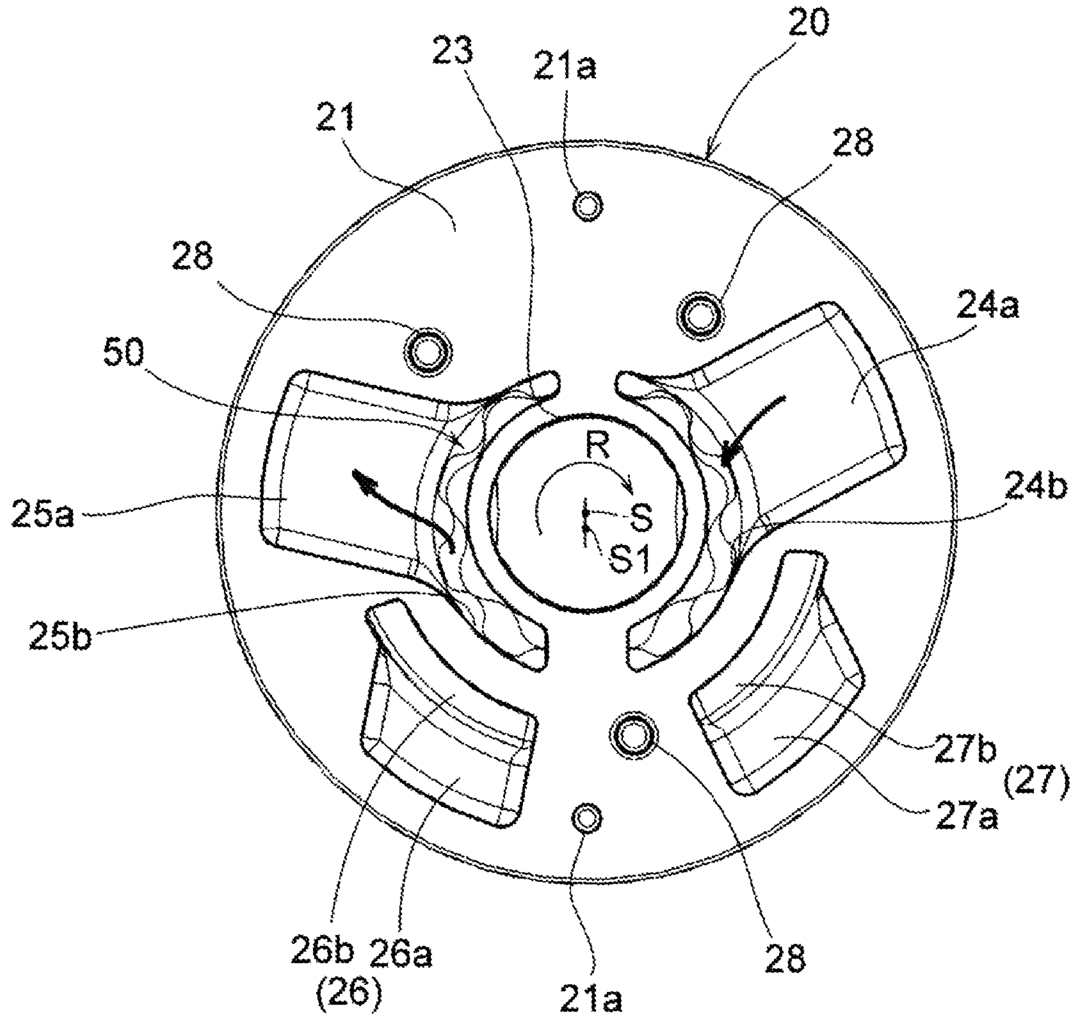
FIG. 8 shows the intervening member included in the pump device according to an embodiment, and is an end surface view perpendicular to the axis.
Figure 9:
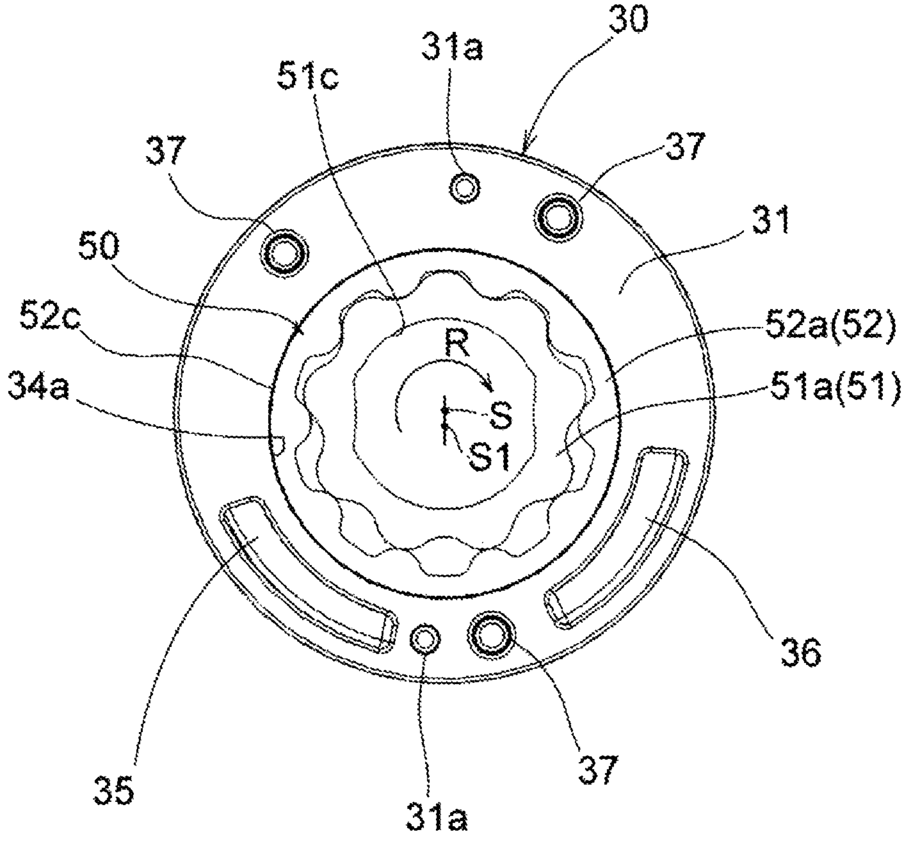
FIG. 9 shows the first housing member housing the first pump element and formed with the internal passages (a part of the second suction passage and the second discharge passage) in the pump device according to an embodiment, and is an end surface view perpendicular to the axis S.

The intervening member 20 is formed in a substantially disk shape using a metal material such as steel, cast iron, sintered steel, and aluminum alloy, and as shown in FIG. 4, FIG. 5, and FIG. 8, includes joint surfaces 21 and 22, an insertion hole 23, a first suction passage 24*a* and a first suction port 24*b*, a first discharge passage 25*a* and a first discharge port 25*b*, a second suction passage 26, a second discharge passage 27, and three circular holes 28 through which the bolts B pass. Here, the first suction passage 24*a*, the first discharge passage 25*a*, the second suction passage 26, and the second discharge passage 27 function as the internal passages defined by the housing H.

The joint surface 21 is formed as a circular flat surface perpendicular to the axis S to be joined to the joint surface 14 of the outer member 10, and includes two positioning holes 21*a* for fitting the positioning pins $P_1$. The joint surface 22 is formed as a circular flat surface perpendicular to the axis S to be joined to the joint surface 31 of the first housing member 30, and includes two positioning holes 22*a* for fitting the positioning pins $P_2$. The insertion hole 23 is formed as a circular hole centered on the axis S to allow the rotation shaft RS to pass in a non-contact manner.

The first suction passage 24*a* is formed by recessing the joint surface 21 in the direction of the axis S, and communicates with the first suction passage 15*b* in the assembled state. The first suction port 24*b* is a region for sucking the fluid toward the pump chamber of the first pump element 50, and is formed around the insertion hole 23 as a through hole having a crescent-shaped outline to face the first end surface (end surfaces 51*a* and 52*a*) of the first pump element 50 directed to the one end side $E_1$ of the housing H.

The first discharge passage 25*a* is formed by recessing the joint surface 21 in the direction of the axis S, and communicates with the first discharge passage 16*b* in the assembled state. The first discharge port 25*b* is a region for discharging the pressurized fluid from the pump chamber of the first pump element 50, and is formed around the insertion hole 23 as a through hole having a crescent-shaped outline to face the first end surface (end surfaces 51*a* and 52*a*) of the first pump element 50 directed to the one end side $E_1$ of the housing H.

The second suction passage 26 is formed in a region outside the first pump element 50 in the radial direction perpendicular to the axis S, and is formed by a recess passage 26*a* recessed from the joint surface 21 in the direction of the axis S and an arc-shaped through passage 26*b*. Then, the second suction passage 26 communicates with the second suction passage 17*b* in the assembled state. The second discharge passage 27 is formed in a region outside the first pump element 50 in the radial direction perpendicular to the axis S, and is formed by a recess passage 27*a* recessed from the joint surface 21 in the direction of the axis S and an arc-shaped through passage 27*b*. Then, the second discharge passage 27 communicates with the second discharge passage 18*b* in the assembled state.

The first housing member 30 is formed in a bottomed cylindrical shape using a metal material such as steel, cast iron, sintered steel, and aluminum alloy, and as shown in FIG. 4 to FIG. 7 and FIG. 9, includes joint surfaces 31 and 32, an insertion hole 33, a pump housing chamber 34, a second suction passage 35, a second discharge passage 36, and three circular holes 37 through which the bolts B pass. Here, the second suction passage 35 and the second discharge passage 36 function as the internal passages defined by the housing H.

The joint surface 31 is formed as a circular flat surface perpendicular to the axis S to be joined to the joint surface 22 of the intervening member 20, and includes two positioning holes 31*a* for fitting the positioning pins $P_2$. The joint surface 32 is formed as a circular flat surface perpendicular to the axis S to be joined to the joint surface 41 of the second housing member 40, and includes two positioning holes 32*a* for fitting the positioning pins $P_3$. The insertion hole 33 is formed as a circular hole centered on the axis S to allow the rotation shaft RS to pass in a non-contact manner.

The pump housing chamber 34 is a region that rotatably houses the first pump element 50, and is defined by an inner peripheral surface 34*a* that supports the first outer rotor 52 of the first pump element 50, and a blocking wall 34*b* that is formed in an annular shape around the insertion hole 33 and blocks between the first pump element 50 and the second pump element 60. The inner peripheral surface 34*a* is formed as a cylindrical surface centered on a first biased axis S1 parallel to the axis S, and slidably supports an outer peripheral surface 52*c* of the first outer rotor 52. The blocking wall 34*b* is formed to bring the end surfaces 51*b* and 52*b* of the first pump element 50 into close contact and slidably support the end surfaces 51*b* and 52*b*, and completely isolate the pump chamber of the first pump element 50 and the pump chamber of the second pump element 60 so that the respective pumping actions are not affected.

The second suction passage 35 is formed as an arc-shaped through passage in a region around the first pump element 50 in the radial direction perpendicular to the axis S, that is, in the outer region around the pump housing chamber 34. Then, the second suction passage 35 communicates with the second suction passage 26 (through passage 26*b*) in the assembled state. The second discharge passage 36 is formed as an arc-shaped through passage in a region around the first pump element 50 in the radial direction perpendicular to the axis S, that is, in the outer region around the pump housing chamber 34. Then, the second discharge passage 36 communicates with the second discharge passage 27 (through passage 27*b*) in the assembled state.

The second housing member 40 is positioned on the other end side $E_2$ of the housing H and is formed in a bottomed cylindrical shape, which has the same outer diameter as the first housing member 30, using a metal material such as steel, cast iron, sintered steel, and aluminum alloy, and as shown in FIG. 4 to FIG. 7 and FIG. 10, includes a joint surface 41, an outer end surface 42, an insertion hole 43, a pump housing chamber 44, a second suction passage 45*a* and a second suction port 45*b*, a second discharge passage 46*a* and a second discharge port 46*b*, and three circular holes 47 through which the bolts B pass. Here, the second suction passage 45*a* and the second discharge passage 46*a* function as the internal passages defined by the housing H.

The joint surface 41 is formed as a circular flat surface perpendicular to the axis S to be joined to the joint surface 32 of the first housing member 30, and includes two positioning holes 41*a* for fitting the positioning pins $P_3$. The outer end surface 42 is formed as a circular flat surface perpendicular to the axis S, and includes three recesses 42*a* forming the seat surfaces for the bolts B around the circular holes 47. The insertion hole 43 is formed as a circular hole centered on the axis S to allow the rotation shaft RS to pass in a non-contact manner.

The pump housing chamber 44 is a region that rotatably houses the second pump element and is defined by an inner peripheral surface 44*a* that supports the second outer rotor 62 of the second pump element 60, and an inner wall surface 44*b* that is formed in an annular shape around the insertion hole 43 and supports the second end surface (end surfaces 61*b* and 62*b*) of the second pump element 60. The inner peripheral surface 44*a* is formed as a cylindrical surface centered on a second biased axis S2 parallel to the axis S, and slidably supports an outer peripheral surface 62*c* of the second outer rotor 62. Here, as shown in FIG. 6, FIG. 7, FIG. 9, and FIG. 10, the second biased axis S2 is arranged around the axis S at a position separated from the first biased axis S1 by 180 degrees. The inner wall surface 44*b* is formed as a flat surface to bring the end surfaces 61*b* and 62*b* of the second pump element 60 into close contact and slidably support the end surfaces 61*b* and 62*b*.

Figure 10:
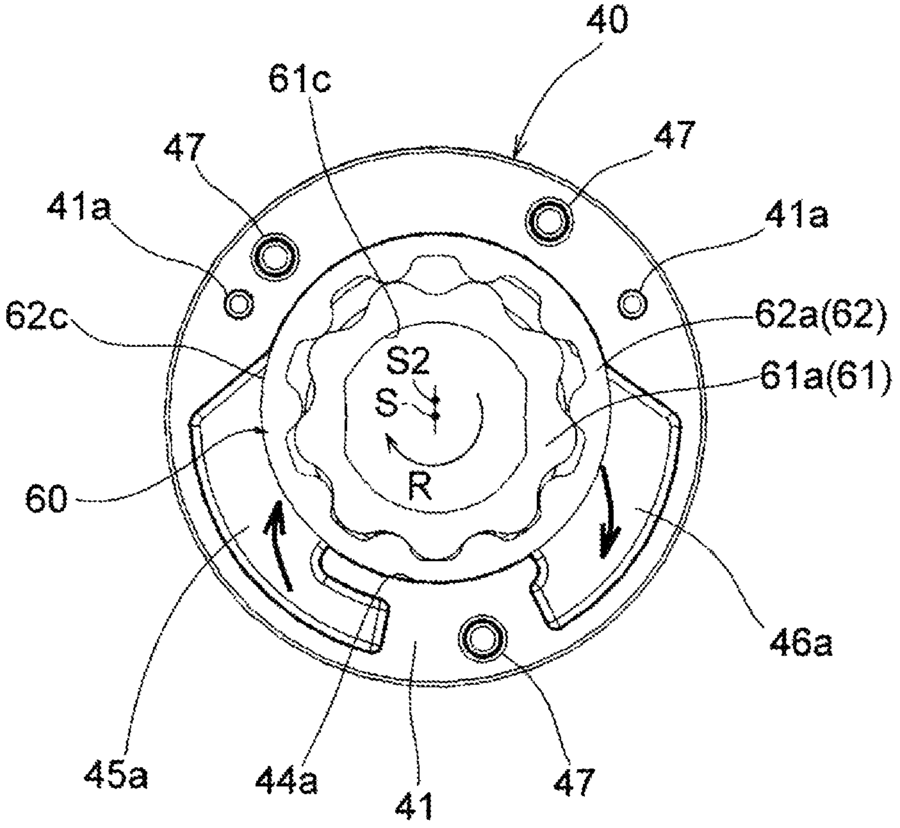
FIG. 10 shows the second pump element and the second housing member in the pump device according to an embodiment, and is an end surface view perpendicular to the axis.
Figure 11:
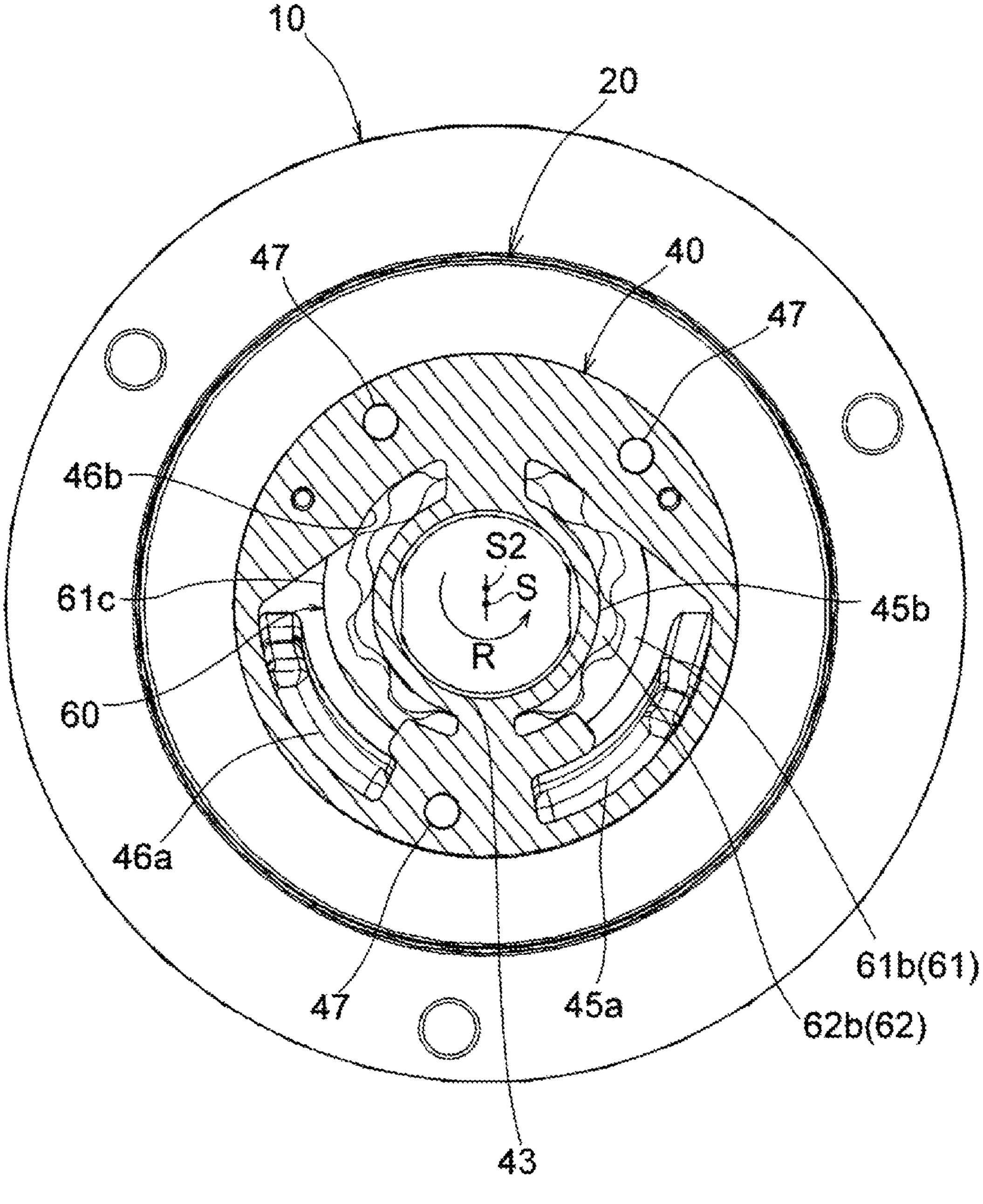
FIG. 11 shows the second pump element and the second housing member in the pump device according to an embodiment, and is a cross-sectional view perpendicular to the axis seen from the other end side of the housing.

As shown in FIG. 10, the second suction passage 45*a* is formed as an arc-shaped recess passage in a region around the second pump element 60 in the radial direction perpendicular to the axis S, that is, in the outer region around the pump housing chamber 44. Then, the second suction passage 45*a* communicates with the second suction passage 35 in the assembled state. The second suction port 45*b* is a region for sucking the fluid toward the pump chamber of the second pump element 60, and as shown in FIG. 11, is formed around the insertion hole 43 to have a crescent-shaped outline, with the inner wall surface 44*b* hollowed out, to face the second end surface (end surfaces 61*b* and 62*b*) of the second pump element 60 directed to the other end side $E_2$ of the housing H.

As shown in FIG. 10, the second discharge passage 46*a* is formed as an arc-shaped recess passage in a region around the second pump element 60 in the radial direction perpendicular to the axis S, that is, in the outer region around the pump housing chamber 44. Then, the second discharge passage 46*a* communicates with the second discharge passage 36 in the assembled state. The second discharge port 46*b* is a region for discharging the pressurized fluid from the pump chamber of the second pump element 60, and as shown in FIG. 11, is formed around the insertion hole 43 to have a crescent-shaped outline, with the inner wall surface 44*b* hollowed out, to face the second end surface (end surfaces 61*b* and 62*b*) of the second pump element 60 directed to the other end side $E_2$ of the housing H.

Figure 7:
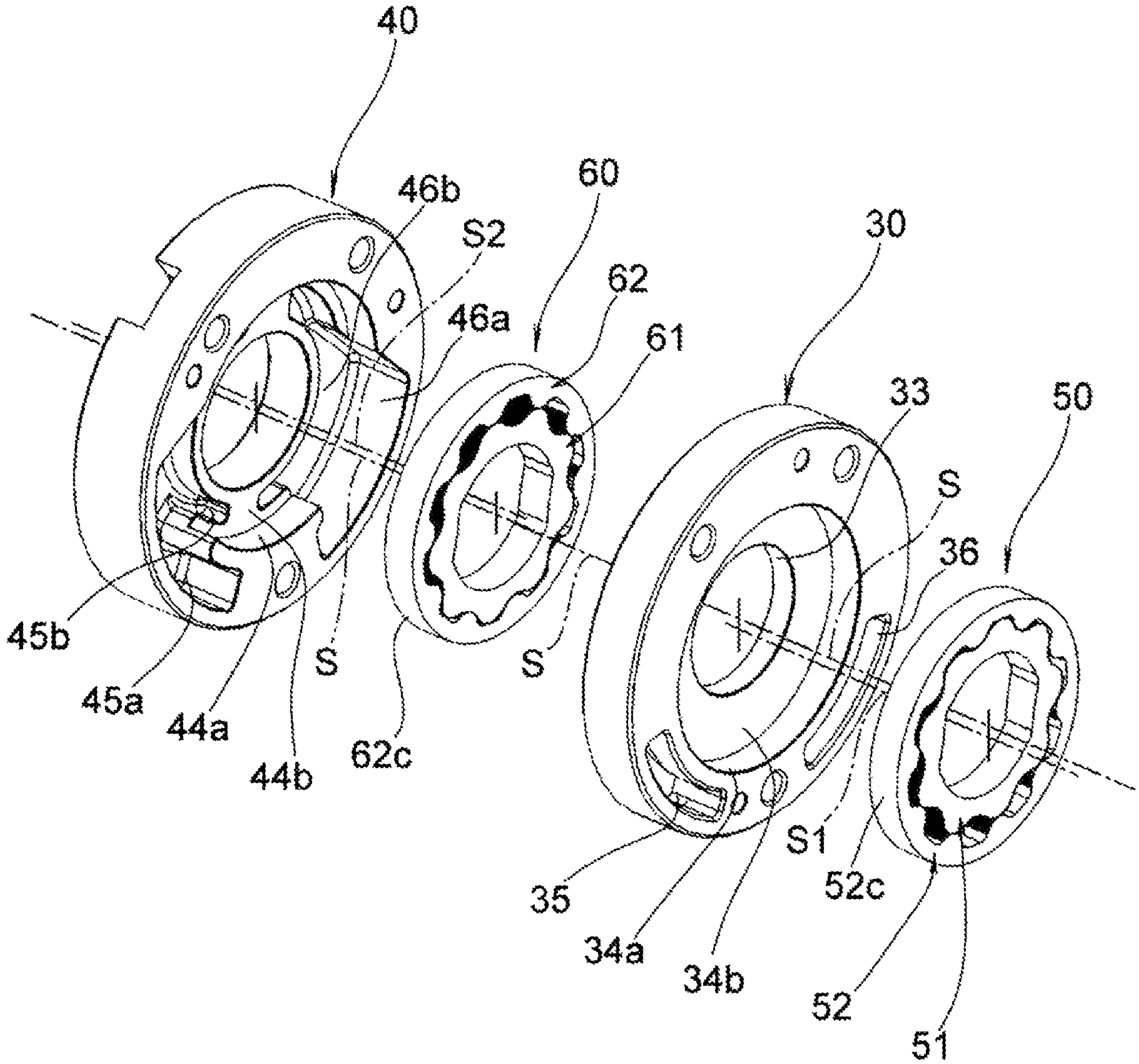
FIG. 7 is an exploded perspective view showing the first pump element (first inner rotor and first outer rotor) and the first housing member, and the second pump element (second inner rotor and second outer rotor) and the second housing member in the pump device according to an embodiment.

The first pump element 50 is disposed in the pump housing chamber 34 of the first housing member 30 to exert pumping actions of sucking, pressurizing, and discharging the fluid, and is configured by the first inner rotor 51 and the first outer rotor 52 as shown in FIG. 4, FIG. 5, and FIG. 7.

The first inner rotor 51 is formed as an external gear, which has a tooth profile based on a trochoid curve, using a metal material such as steel and sintered steel, and includes an end surface 51*a* as the first end surface directed to the one end side $E_1$ of the housing H in the direction of the axis S, an end surface 51*b* directed to the other end side $E_2$, and a fitting hole 51*c* for fitting the rotation shaft RS. Then, the first inner rotor 51 rotates integrally with the rotation shaft RS in one direction (direction of the arrow R) around the axis S.

The first outer rotor 52 is formed as an internal gear, which has a tooth profile that can mesh with the first inner rotor 51, using a metal material such as steel and sintered steel, and includes an end surface 52*a* as the first end surface directed to the one end side $E_1$ of the housing H in the direction of the axis S, an end surface 52*b* directed to the other end side $E_2$, and a cylindrical outer peripheral surface 52*c* centered on the first biased axis S1 to be slidably supported by the inner peripheral surface 34*a* of the first housing member 30.

Then, while being interlocked with the rotation of the first inner rotor 51 that rotates around the axis S in one direction (direction of the arrow R), the first outer rotor 52 rotates in the same direction as the first inner rotor 51 around the first biased axis S1 at a lower speed than the first inner rotor 51. In addition, as the first inner rotor 51 and the first outer rotor 52 partially mesh with each other, the pumping actions of sucking, pressurizing, and discharging occur continuously in the pump chamber defined therebetween.

The second pump element 60 is disposed in the pump housing chamber 44 of the second housing member 40 to exert pumping actions of sucking, pressurizing, and discharging the fluid, and is configured by the second inner rotor 61 and the second outer rotor 62 as shown in FIG. 4, FIG. 5, and FIG. 7.

The second inner rotor 61 is formed as an external gear, which has a tooth profile based on a trochoid curve, using a metal material such as steel and sintered steel, and includes an end surface 61*a* directed to the one end side $E_1$ of the housing H in the direction of the axis S, an end surface 61*b* directed to the other end side $E_2$, and a fitting hole 61*c* for fitting the rotation shaft RS. Then, the second inner rotor 61 rotates integrally with the rotation shaft RS in one direction (direction of the arrow R) around the axis S.

The second outer rotor 62 is formed as an internal gear, which has a tooth profile that can mesh with the second inner rotor 61, using a metal material such as steel and sintered steel, and includes an end surface 62*a* directed to the one end side $E_1$ of the housing H in the direction of the axis S, an end surface 62*b* as the second end surface directed to the other end side $E_2$, and a cylindrical outer peripheral surface 62*c* centered on the second biased axis S2 to be slidably supported by the inner peripheral surface 44*a* of the second housing member 40.

Then, while being interlocked with the rotation of the second inner rotor 61 that rotates around the axis S in one direction (direction of the arrow R), the second outer rotor 62 rotates in the same direction as the second inner rotor 61 around the second biased axis S2 at a lower speed than the second inner rotor 61. In addition, as the second inner rotor 61 and the second outer rotor 62 partially mesh with each other, the pumping actions of sucking, pressurizing, and discharging occur continuously in the pump chamber defined therebetween.

Here, the first pump element 50 and the second pump element 60 have the same shape. That is, the first inner rotor 51 and the second inner rotor 61 are the same, and the first outer rotor 52 and the second outer rotor 62 are the same. Thus, the first pump element 50 and the second pump element 60 are not mistakenly assembled, and the common use of parts also contributes to cost reduction.

Next, the pumping operations in a state where the pump device M according to the above embodiment is assembled to the applicable object A will be briefly described. In addition, in the state where the pump device M is assembled to the applicable object A, the first suction pipe 15 and the second suction pipe 17 are connected to introduction pipes (not shown) for introducing oil as a fluid, and the first discharge pipe 16 and the second discharge pipe 18 are connected to feeding pipes (not shown) for feeding the oil to respective supply destinations.

Figure 12:
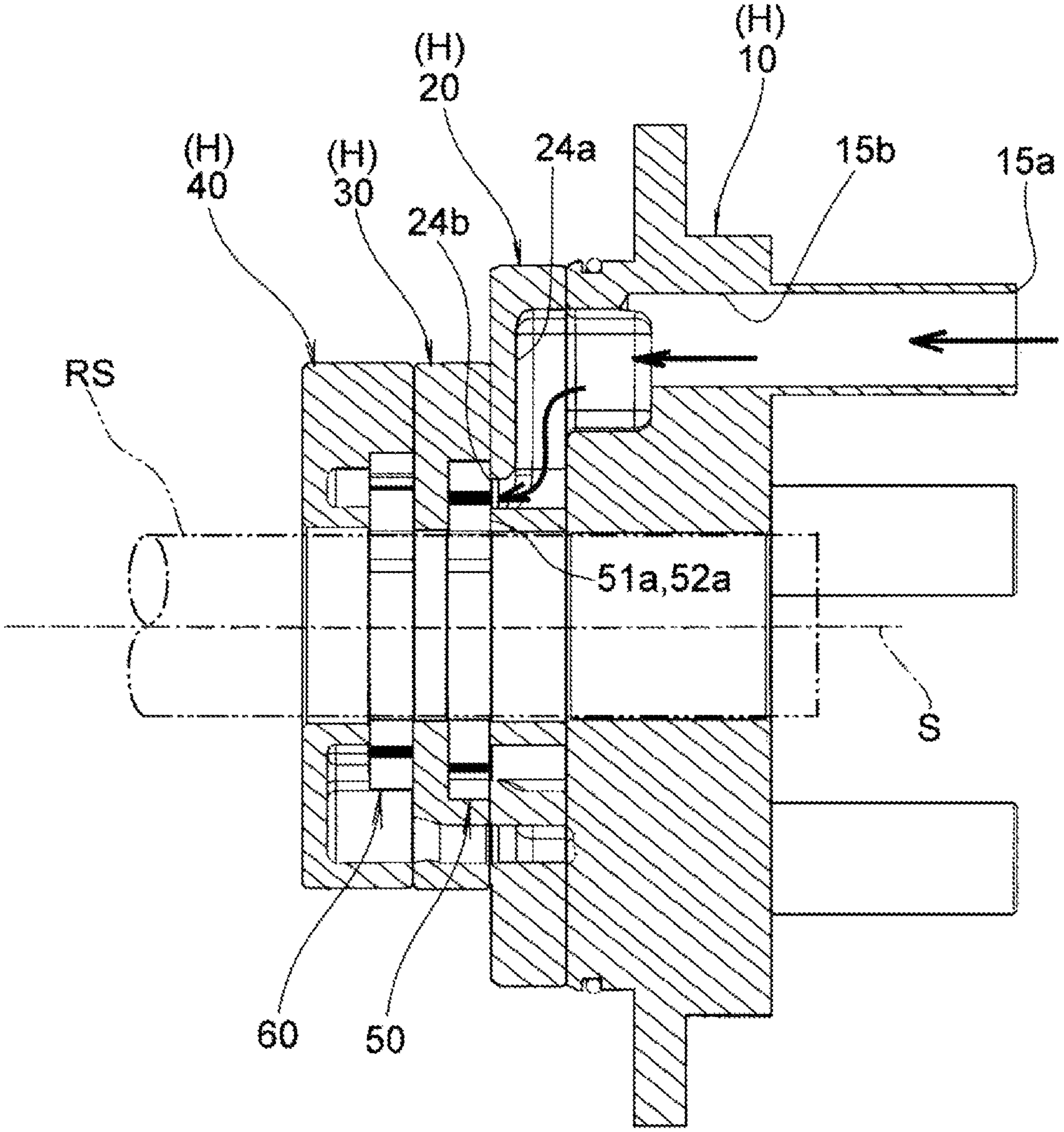
FIG. 12 is a cross-sectional view showing the first suction passage for fluid communicating with the first pump element in the pump device according to an embodiment.
Figure 13:
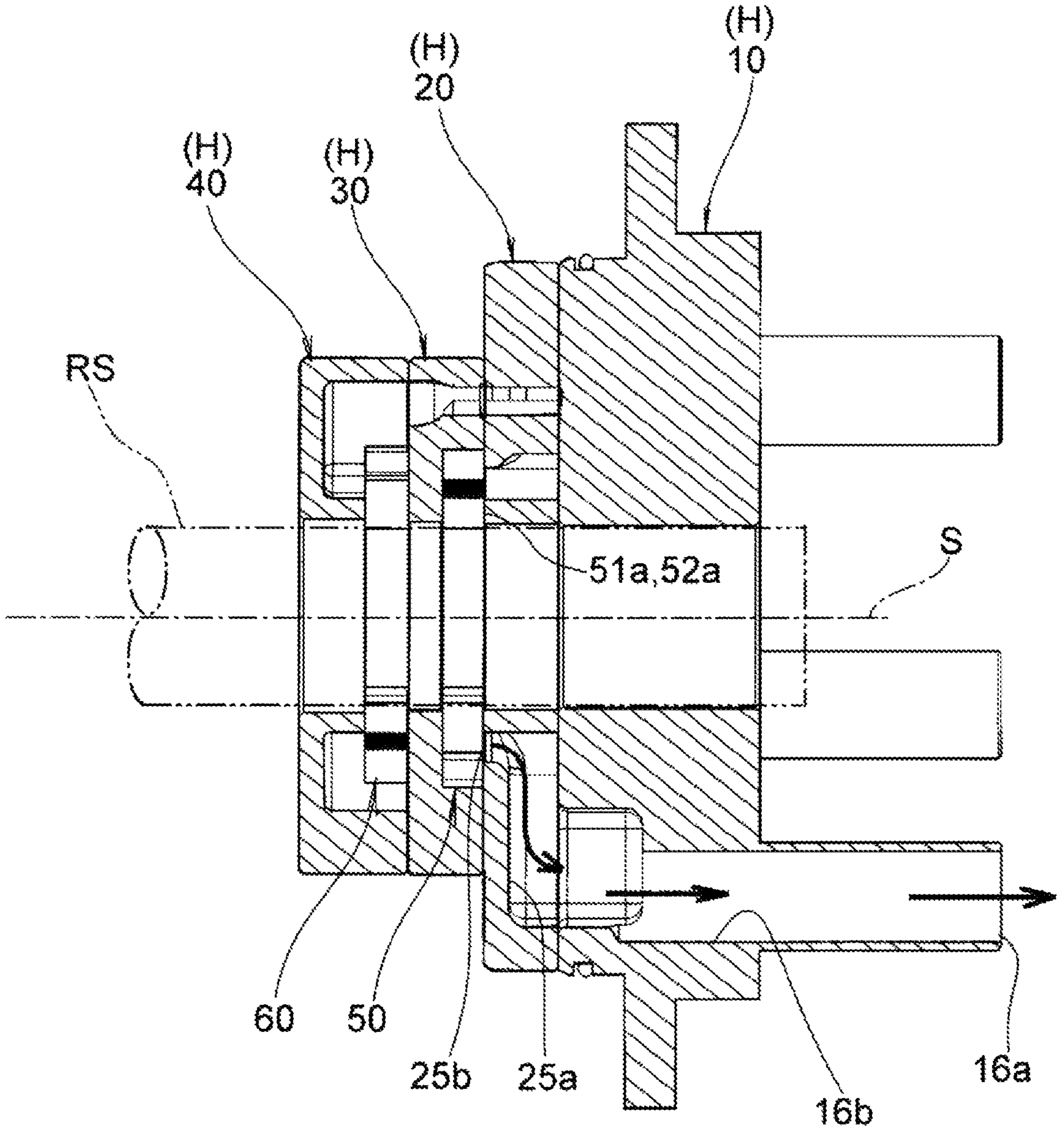
FIG. 13 is a cross-sectional view showing the first discharge passage for fluid communicating with the first pump element in the pump device according to an embodiment.

When the rotation shaft RS rotates in one direction (direction of the arrow R) in this state, the first pump element 50 and the second pump element 60 continuously perform the pumping operations of sucking, pressurizing, and discharging independently, and the oil is continuously sucked, pressurized, and discharged. That is, as shown in FIG. 12, the oil flowing in from the first inlet 15*a* of the first suction pipe 15 is sucked into the pump chamber of the first pump element from the first suction port 24*b* through the first suction passages 15*b* and 24*a*. Then, as shown in FIG. 13, the pressurized oil pressurized by the first pump element 50 and discharged from the first discharge port 25*b* is fed to a predetermined feeding destination from the first outlet 16*a* through the first discharge passages 25*a* and 16*b*.

Figure 14:
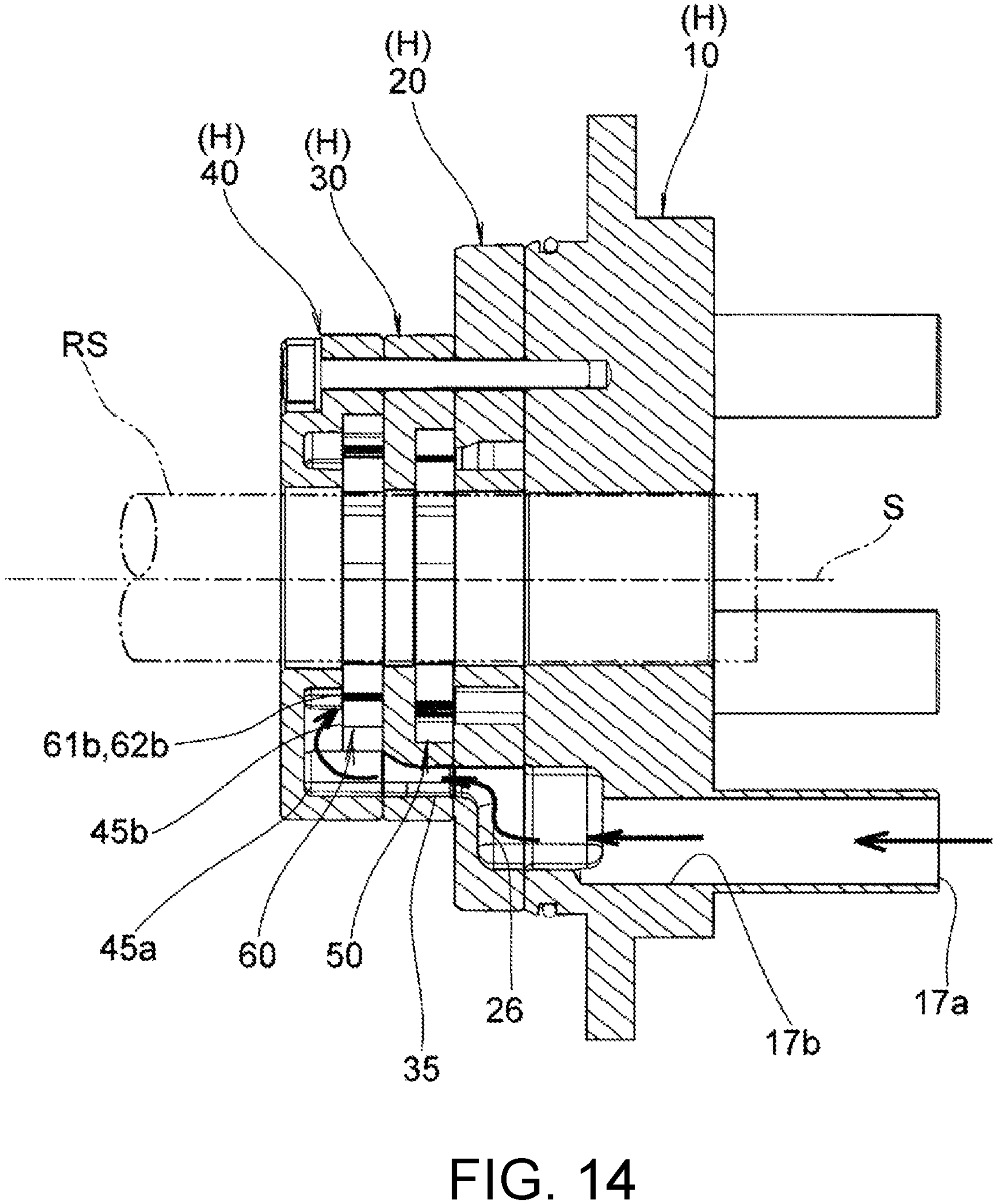
FIG. 14 is a cross-sectional view showing the second suction passage for fluid communicating with the second pump element in the pump device according to an embodiment.
Figure 15:
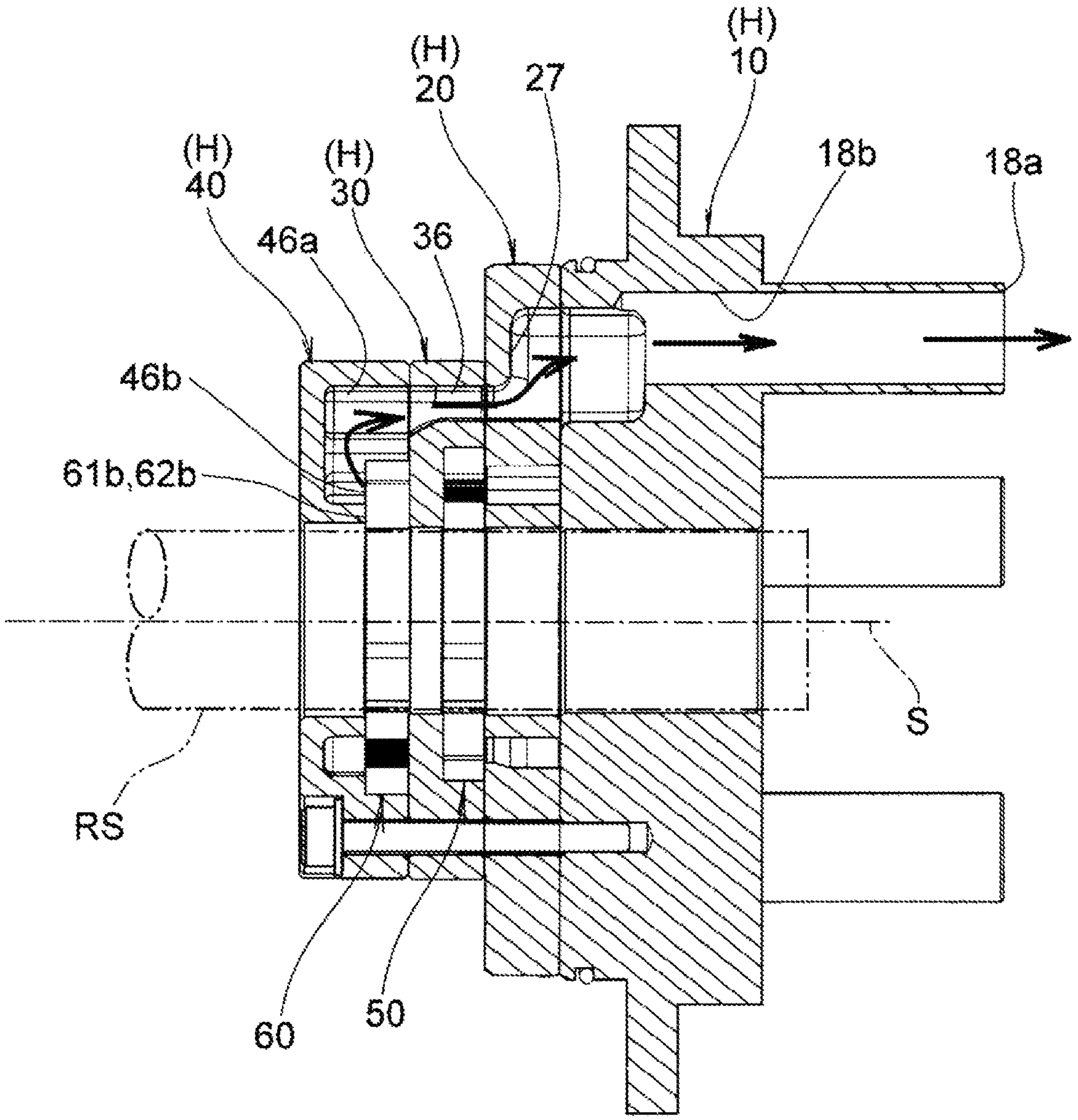
FIG. 15 is a cross-sectional view showing the second discharge passage for fluid communicating with the second pump element in the pump device according to an embodiment.
Figure 16:
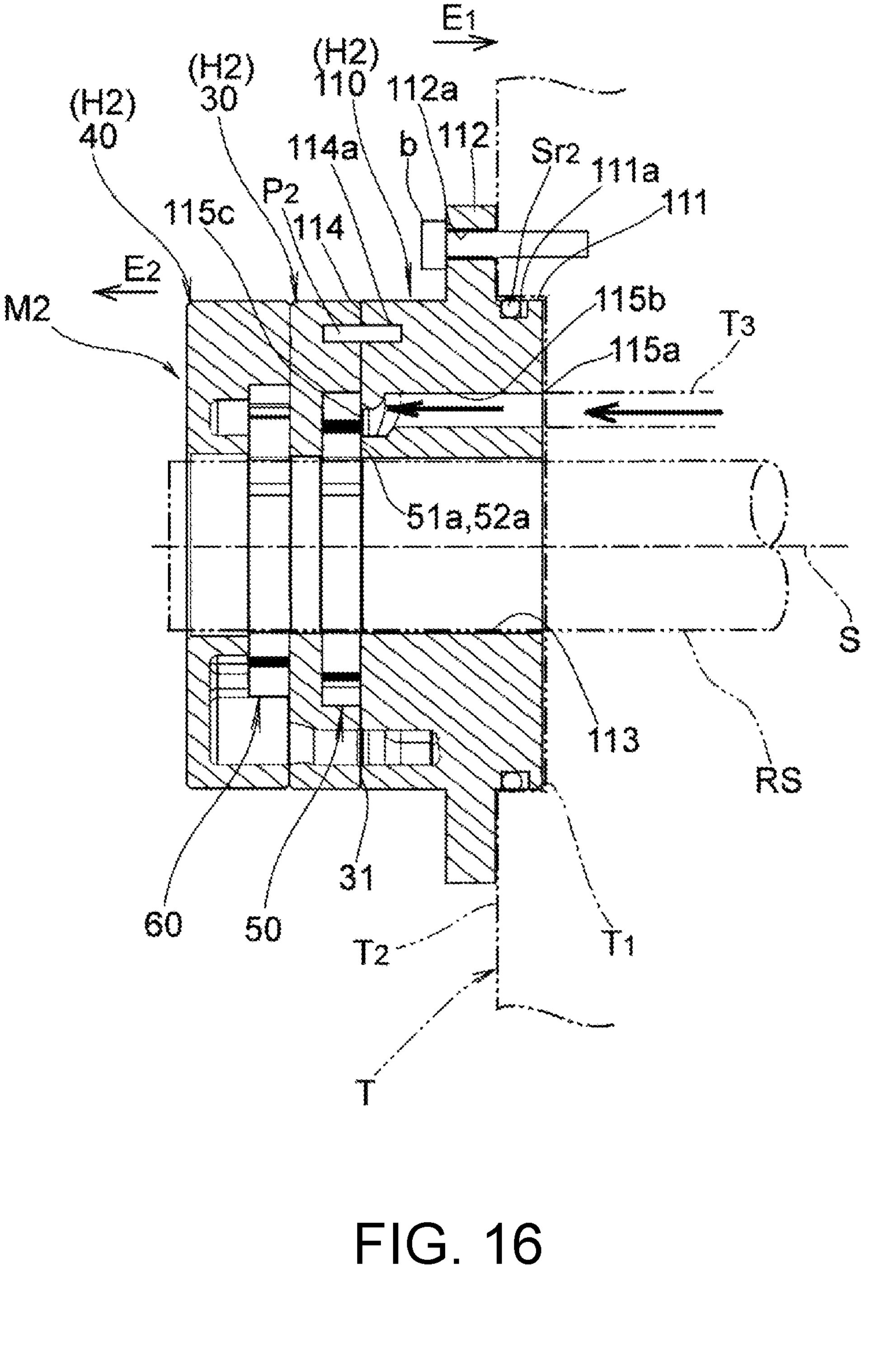
FIG. 16 is a cross-sectional view showing the first suction passage for fluid communicating with the first pump element in the pump device according to another embodiment of the disclosure.
Figure 17:
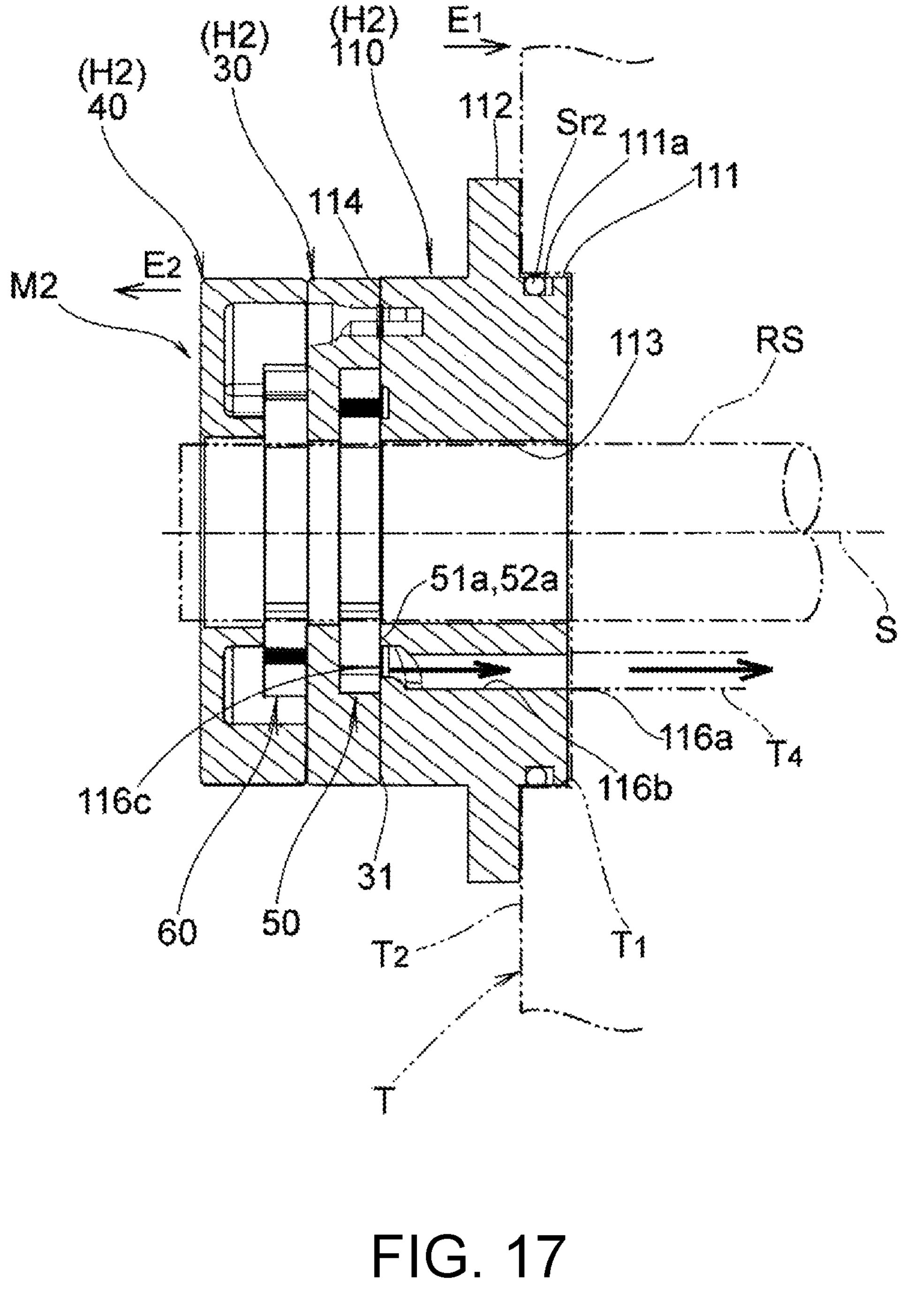
FIG. 17 is a cross-sectional view showing the first discharge passage for fluid communicating with the first pump element in the pump device according to another embodiment shown in FIG. 16.
Figure 18:
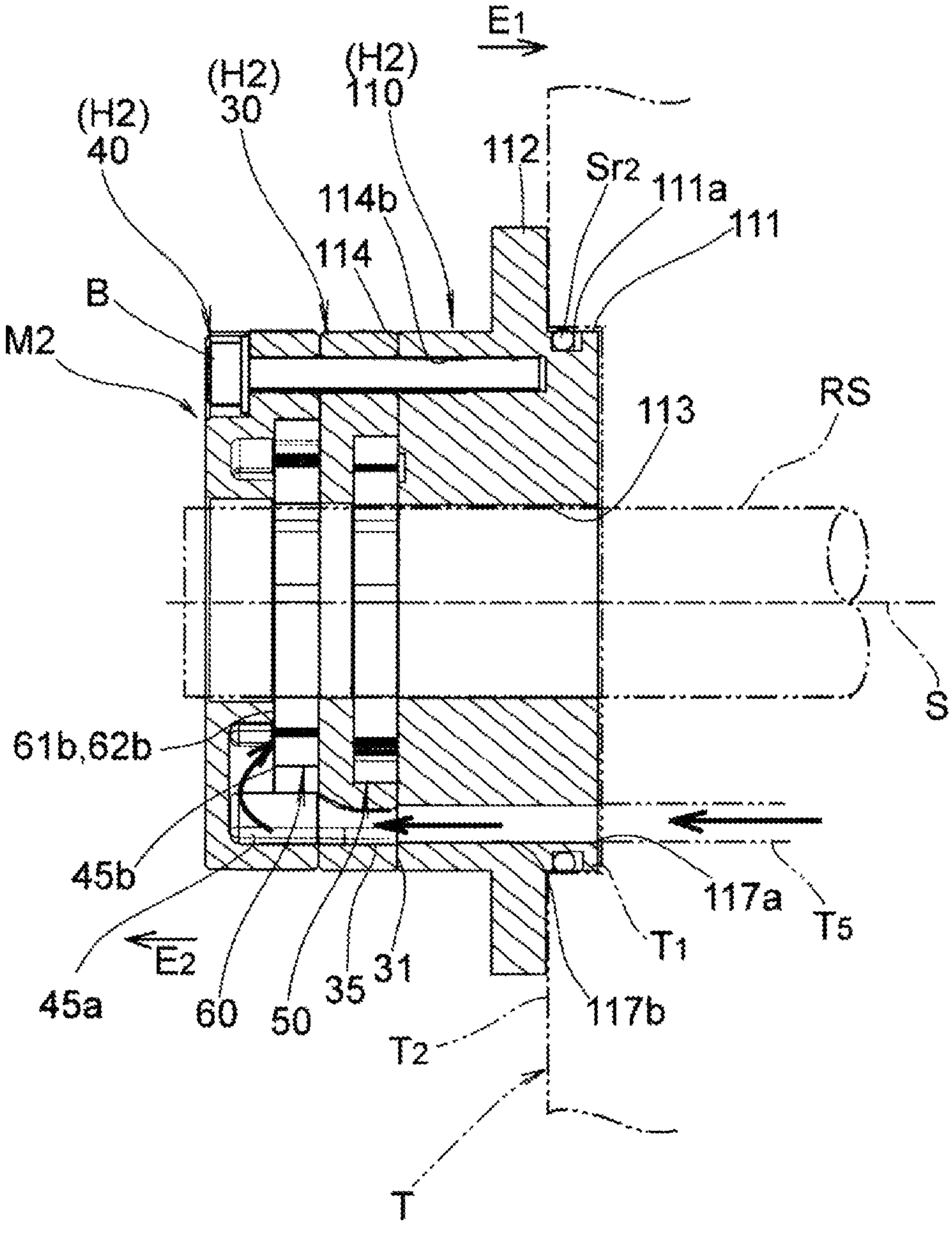
FIG. 18 is a cross-sectional view showing the second suction passage for fluid communicating with the second pump element in the pump device according to another embodiment shown in FIG. 16.
Figure 19:
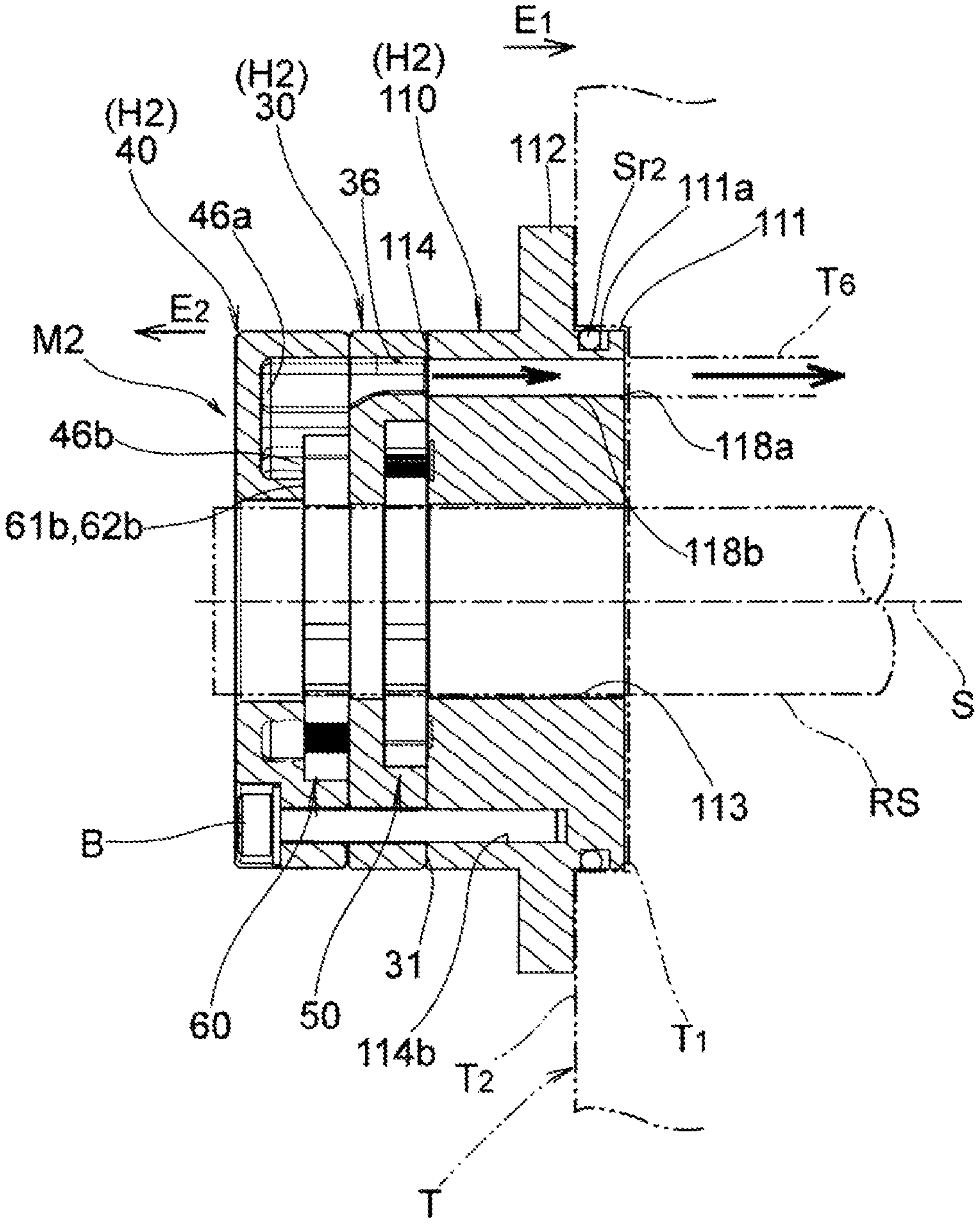
FIG. 19 is a cross-sectional view showing the second discharge passage for fluid communicating with the second pump element in the pump device according to another embodiment shown in FIG. 16.

Further, as shown in FIG. 14, the oil flowing in from the second inlet 17*a* of the second suction pipe 17 is sucked into the pump chamber of the second pump element 60 from the second suction port 45*b* through the second suction passages 17*b*, 26, 35, and 45*a*. Then, as shown in FIG. 15, the pressurized oil pressurized by the second pump element 60 and discharged from the second discharge port 46*b* is fed to a predetermined feeding destination from the second outlet 18*a* through the second discharge passages 46*a*, 36, 27, and 18*b*.

The pump device M according to the above embodiment includes the housing H defining the insertion holes 13, 23, 33, and 43 through which the rotation shaft RS rotating around the predetermined axis S is inserted, the fluid inlets (15*a* and 17*a*) and outlets (16*a* and 18*a*) which open on the one end side $E_1$ in the direction of the axis S, and the internal passages which allow the fluid to pass; and the first pump element 50 arranged near the one end side $E_1$ and the second pump element 60 arranged adjacent to the first pump element 50 to be rotationally driven by the rotation shaft RS within the housing H. The internal passages include the first suction passages 15*b* and 24*a* which communicate from the inlet (15*a*) to the first suction port 24*b* facing the first end surface (end surfaces 51*a* and 52*a*) of the first pump element 50 directed to the one end side $E_1$; the first discharge passages 26*a* and 16*b* which communicate from the first discharge port 26*b* facing the first end surface (end surfaces 51*a* and 52*a*) to the outlet (16*a*); the second suction passages 17*b*, 26, 35, and 45*a* which communicate from the inlet (17*a*) to the second suction port 45*b* facing the second end surface (end surfaces 61*b* and 62*b*) of the second pump element 60 via the circumference of the first pump element 50; and the second discharge passages 46*a*, 36, 27, and 18*b* which communicate from the second discharge port 46*b* facing the second end surface (end surfaces 61*b* and 62*b*) to the outlet (18*a*) via the circumference of the first pump element 50.

That is, on the premise that the inlets (15*a* and 17*a*) and the outlets (16*a* and 18*a*) open on the one end side $E_1$ of the housing H in the direction of the axis S, the first suction passages 15*b* and 24*a* and the first discharge passages 26*a* and 16*b* are formed to directly communicate from the inlet (15*a*) and the outlet (16*a*) to the first suction port 24*b* and the first discharge port 25*b* that face the first end surface (end surfaces 51*a* and 52*a*) directed to the one end side $E_1$. Thus, the first suction passages 15*b* and 24*a* and the first discharge passages 26*a* and 16*b* as internal passages can be collectively arranged to be close to the axis S compared to a case where the first suction passages 15*b* and 24*a* and the first discharge passages 26*a* and 16*b* are formed to detour around the first pump element 50. Thereby, the second suction passages 17*b*, 26, 35, and 45*a* and the second discharge passages 46*a*, 36, 27, and 18*b* leading to the second pump element 60 are arranged to pass around the first pump element 50, and can be collectively arranged to be close to the axis S. As a result, particularly the outer diameters of the first housing member 30 and the second housing member 40 that constitute the housing H can be reduced. The outer diameters of the outer member 10 and the intervening member 20 are formed to be larger than the outer diameters of the first housing member 30 and the second housing member 40 due to the restrictions of the applicable object A, but if the applicable object has no restriction, the outer diameters can be the same as or equivalent to the outer diameters of the first housing member 30 and the second housing member 40 to make the housing H compact as a whole.

In the above embodiment, the second end surface of the second pump element 60 is the end surfaces 61*b* and 62*b* directed to the other end side $E_2$ opposite to the one end side $E_1$ in the direction of the axis S, the second suction passage 45*a* is formed to pass around the second pump element 60 to communicate with the second suction port 45*b*, and the second discharge passage 46*a* is formed to pass around the second pump element 60 to communicate with the second discharge port 46*b*. According to this, the first suction port 24*b* and the first discharge port 25*b* of the first pump element 50 and the second suction port 45*b* and the second discharge port 46*b* of the second pump element 60 are arranged apart from each other in the direction of the axis S so mutual pumping operations can be prevented from interfering with each other to improve functional reliability.

In the above embodiment, the inlets include the first inlet 15*a* and the second inlet 17*a*, and the outlets include the first outlet 16*a* and the second outlet 18*a*. The first suction passages 15*b* and 24*a* are formed to communicate from the first inlet 15*a* to the first suction port 24*b*, the first discharge passages 25*a* and 16*b* are formed to communicate from the first discharge port 25*b* to the first outlet 16*a*, the second suction passages 17*b*, 26, 35, and 45*a* are formed to communicate from the second inlet 17*a* to the second suction port 45*b*, and the second discharge passages 46*a*, 36, 27, and 18*b* are formed to communicate from the second discharge port 46*b* to the second outlet 18*a*. According to this, the fluid discharged from the first pump element 50 and the fluid discharged from the second pump element 60 can be fed to different feeding destinations. In a configuration with one inlet and one outlet, the fluid discharged from the first pump element 50 and the fluid discharged from the second pump element 60 can be fed to one feeding destination. According to this, it is possible to increase the flow rate of the fluid to be fed while preventing an increase in the diameter of the pump device and achieving a reduction in overall size.

Further, in the above embodiment, the housing H includes the outer member 10 and the intervening member 20 to be joined to the applicable object A as the passage member, the first housing member 30, and the second housing member 40. Thus, the pump device M can be applied to various applicable objects by changing only the outer member 10 to correspond to the applicable object A.

In the above embodiment, the outer member 10 includes the inlets (first inlets 15*a* and 17*a*), the outlets (first outlets 16*a* and 18*a*), a part of the first suction passage (15*b*), a part of the first discharge passage (16*b*), a part of the second suction passage (17*b*), and a part of the second discharge passage (18*b*). The intervening member 20 includes the first suction port 24*b*, the first discharge port 25*b*, a part of the first suction passage (24*a*), a part of the first discharge passage (25*a*), a part of the second suction passage (26), and a part of the second discharge passage (27). The first housing member 30 includes the insertion hole 33, the blocking wall 34*b* blocking between the first pump element 50 and the second pump element 60, a part of the second suction passage (35), and a part of the second discharge passage (36). The second housing member 40 includes the insertion hole 43, the second suction port 45*b*, the second discharge port 46*b*, a part of the second suction passage (45*a*), and a part of the second discharge passage (46*a*). When the first suction passage, the first discharge passage, the second suction passage, and the second discharge passage are formed as the internal passages for the housing H in this way, the outer member 10, the intervening member 20, the first housing member 30, and the second housing member 40 respectively share a part of the internal passages so that the internal passages can be easily formed.

In the above embodiment, the first housing member 30 and the second housing member are formed in bottomed cylindrical shapes having the same outer diameter and defining the insertion holes 33 and 43. Thus, while contributing to a reduction in size, the first pump element can be preliminarily assembled to the first housing member 30, the second pump element 60 can be preliminarily assembled to the second housing member 40, and then the overall assembly work can be performed to smoothly carry out the assembly work. Moreover, since the first pump element 50 and the second pump element 60 have the same shape, the first pump element 50 and the second pump element 60 are not mistakenly assembled, and the common use of parts also contributes to cost reduction.

Further, in the above embodiment, the first pump element 50 includes the first inner rotor 51 that rotates around the axis S, and the first outer rotor 52 that rotates around the first biased axis S1 parallel to the axis S in conjunction with the first inner rotor 51. The second pump element 60 includes the second inner rotor 61 that rotates around the axis S, and the second outer rotor 62 that rotates around the second biased axis S2 parallel to the axis S in conjunction with the second inner rotor 61. The first biased axis S1 and the second biased axis S2 are arranged 180 degrees apart around the axis S. According to this, the first pump element 50 and the second pump element 60 do not suck up the fluid in regions adjacent to each other, and particularly can prevent local wear of the bearing at a high rotation speed from being accelerated. Moreover, since the discharge pressure of the first pump element 50 acts on one side of the rotation shaft RS and the discharge pressure of the second pump element 60 acts on the other side of the rotation shaft RS, it is possible to prevent uneven wear or the like from occurring in the bearing region that receives the rotation shaft RS, thereby improving functional reliability. In addition, the first suction port 24*b* and the first discharge port 25*b* of the first pump element 50 and the second suction port 45*b* and the second discharge port 46*b* of the second pump element 60 are angularly shifted around the axis S, and can be collectively arranged so as not to interfere with each other. Thus, as described above, the first suction passages 15*b* and 24*a*, the first discharge passages 25*a* and 16*b*, the second suction passages 17*b*, 26, 35, and 45*a*, and the second discharge passages 46*a*, 36, 27, and 18*b* can be brought close to each other around the axis S and can be collectively arranged, which contributes to a reduction in overall size.

As described above, the pump device M according to the above embodiment is structurally simple and compact and has improved functional reliability.

FIG. 16 to FIG. 19 show a pump device M2 according to another embodiment of the disclosure, which is the same as the above embodiment except that the passage member (the outer member 10 and the intervening member 20) of the pump device M according to the above embodiment is changed to be applied to an applicable object T. Thus, the same configurations are denoted by the same reference numerals, and descriptions thereof are omitted.

The pump device M2 according to this embodiment includes a passage member 110, a first housing member 30, a second housing member 40, a first pump element 50, a second pump element 60, three bolts B for fastening, four positioning pins $P_2$ and $P_3$, and a sealing member $Sr_2$.

The passage member 110 is positioned on one end side $E_1$ of a housing H2 and is formed in a substantially disk shape using a metal material such as steel, cast iron, sintered steel, and aluminum alloy, and includes a fitting portion 111, a flange portion 112, an insertion hole 113, a joint surface 114, a first inlet 115*a* and a first suction passage 115*b* and a first suction port 115*c*, a first outlet 116*a* and a first discharge passage 116*b* and a first discharge port 116*c*, a second inlet 117*a* and a second suction passage 117*b*, and a second outlet 118*a* and a second discharge passage 118*b*. Here, the passage member 110 is formed to have the same outer diameter as the outer diameters of the first housing member 30 and the second housing member 40 except for the flange portion 112.

The fitting portion 111 is formed in a columnar shape to be fitted into a recess $T_1$ of the applicable object T, and includes an annular groove 111*a* for fitting the sealing member $Sr_2$ on the outer peripheral surface. The flange portion 112 includes three circular holes 112*a* through which screws b pass so that the flange portion 112 is joined to an end surface $T_2$ of the applicable object T and fastened and fixed by the screws b. The insertion hole 113 is formed as a circular hole centered on the axis S to allow the rotation shaft RS to pass therethrough in a non-contact manner. The joint surface 114 is formed as a circular flat surface perpendicular to the axis S to be joined to the joint surface 31 of the first housing member 30, and includes two positioning holes 114*a* for fitting the positioning pins $P_2$ and three screw holes 114*b* for screwing the bolts B.

The first inlet 115*a* is connected to face a first introduction passage $T_3$ of the applicable object T. The first suction passage 115*b* communicates from the first inlet 115*a* to the first suction port 115*c* that opens to the joint surface 114. The first suction port 115*c* is a region for sucking the fluid toward the pump chamber of the first pump element 50, and is formed around the insertion hole 113 to form a crescent-shaped outline by recessing the joint surface 114 so as to face the first end surface (end surfaces 51*a* and 52*a*) of the first pump element 50 directed to the one end side $E_1$ of the housing H2.

The first outlet 116*a* is connected to face a first feeding passage $T_4$ of the applicable object T. The first discharge passage 116*b* communicates from the first outlet 116*a* to the first discharge port 116*c* that opens to the joint surface 114. The first discharge port 116*c* is a region for discharging the pressurized fluid from the pump chamber of the first pump element 50, and is formed around the insertion hole 113 to form a crescent-shaped outline by recessing the joint surface 114 so as to face the first end surface (end surfaces 51*a* and 52*a*) of the first pump element directed to the one end side $E_1$ of the housing H2.

The second inlet 117*a* is connected to face a second introduction passage $T_5$ of the applicable object T. The second suction passage 117*b* communicates from the second inlet 117*a* to the second suction passage 35 that opens to the joint surface 114 and opens to the joint surface 31 of the first housing member 30. The second outlet 118*a* is connected to face a second feeding passage $T_6$ of the applicable object T. The second discharge passage 118*b* communicates from the second outlet 118*a* to the second discharge passage 36 that opens to the joint surface 114 and opens to the joint surface 31 of the first housing member 30.

Here, the first suction passage 115*b*, the first discharge passage 116*b*, the second suction passage 117*b*, and the second discharge passage 118*b* function as the internal passages defined by the housing H2. In addition, the first inlet 115*a* and the second inlet 117*a* serving as inlets, and the first outlet 116*a* and the second outlet 118*a* serving as outlets are formed to open on one end side $E_1$ of the housing H2 (passage member 110) in the direction of the axis S.

According to the pump device M2 according to this embodiment, compared to the pump device M according to the above embodiment, the number of parts constituting the housing H2 can be reduced and the outer diameter of the housing H2 can be reduced to make the structure simple and more compact, and similarly to the pump device M according to the above embodiment, it is possible to improve functional reliability.

In the pump device M according to the above embodiment, the second end surface which the second suction port and the second discharge port of the second pump element 60 face is the end surfaces 61*b* and 62*b* directed to the other end side $E_2$ opposite to the one end side $E_1$ of the housing H in the direction of the axis S, and in the second housing member 40, the second suction passage 45*a* passes around the second pump element 60 to communicate with the second suction port 45*b*, and the second discharge passage 46*a* passes around the second pump element 60 to communicate with the second discharge port 46*b*. However, the disclosure is not limited thereto. For example, the end surfaces 61*a* and 62*a* directed to the one end side $E_1$ of the housing H may be used as the second end surface of the second pump element 60, and the second suction port and the second discharge port may be defined on the side of the joint surface 32 of the first housing member 30.

In the pump device M according to the above embodiment, the intervening member 20 includes the first suction passage 24*a* as a part of the first suction passage and the first discharge passage 25*a* as a part of the first discharge passage. However, the disclosure is not limited thereto. The intervening member may have a configuration which does not include the first suction passage 24*a* and the first discharge passage 25*a* and in which the first suction passage 15*b* and the first discharge passage 16*b* of the outer member 10 directly communicate with the first suction port 24*b* and the first discharge port 25*b* of the intervening member, respectively.

In the pump devices M and M2 according to the above embodiments, the first pump element 50 and the second pump element 60 have the same shape, and the first housing member 30 and the second housing member 40 are formed in bottomed cylindrical shapes which have the same outer diameter and define the insertion holes 33 and 43. However, the disclosure is not limited thereto. If required, the first pump element 50 and the second pump element 60 may be rotors of different forms and different types and have outer diameters different from each other, and a first housing member and a second housing member that form different outer diameters may be used.

In the pump device M according to the above embodiment, the outer member 10 and the intervening member 20 include the insertion holes 13 and 23. However, the disclosure is not limited thereto, and the insertion holes 13 and 23 may be eliminated as long as the rotation shaft RS is reliably supported on the side of the applicable object A. In the pump device M2 according to the above embodiment, the second housing member 40 includes the pump housing chamber 44. However, the disclosure is not limited thereto, and a second housing member in which the pump housing chamber 44 is eliminated and closed may be used.

In the above embodiment, the first pump element 50 and the second pump element 60, which are composed of the trochoid toothed inner rotor and outer rotor, are shown as the first pump element and the second pump element. However, the disclosure is not limited thereto, and pump elements including vane-type rotors and other displacement-type rotors may be used as long as the rotor type exerts pumping actions on the fluid.

In the above embodiment, a sliding part, drive system, or functional part of an engine mounted on an automobile or the like is shown as the applicable object to which the pump device according to the disclosure is applied. However, the disclosure is not limited thereto, and may be applied to transmissions and other lubricating equipment and may be applied to fluid equipment that use fluids other than oil (lubricating oil and hydraulic oil).

As described above, since the pump device according to the disclosure is structurally simple and compact and has improved functional reliability, the pump device is applicable not only to oil feeding destinations such as vehicles but also to oil equipment in other fields or equipment that feeds other fluids.

What is claimed is:

1. A pump device, comprising:

a housing defining an insertion hole through which a rotation shaft that rotates around a predetermined axis is inserted, an inlet and an outlet for a fluid which open on one end side in an axial direction of the axis, and an internal passage through which the fluid passes; and a first pump element arranged near the one end side and a second pump element disposed adjacent to the first pump element so as to be rotationally driven by the rotation shaft within the housing, wherein the internal passage comprises a first suction passage communicating from the inlet to a first suction port facing a first end surface of the first pump element directed to the one end side, a first discharge passage communicating from a first discharge port facing the first end surface to the outlet, a second suction passage passing around the first pump element to communicate from the inlet to a second suction port facing a second end surface of the second pump element, and a second discharge passage passing around the first pump element to communicate from a second discharge port facing the second end surface to the outlet, wherein the housing comprises a passage member which defines the one end side and comprises the inlet and the outlet, a first housing member which is connected to the passage member to house the first pump element, and a second housing member which is connected to the first housing member to house the second pump element, wherein the passage member comprises an outer member that is joined to an applicable object, and an intervening member that is interposed between the outer member and the first housing member, wherein the outer member comprises the inlet, the outlet, a part of the first suction passage, a part of the first discharge passage, a part of the second suction passage, and a part of the second discharge passage, the intervening member comprises the first suction port, the first discharge port, a part of the second suction passage, and a part of the second discharge passage, the first housing member comprises the insertion hole, a blocking wall that blocks between the first pump element and the second pump element, a part of the second suction passage, and a part of the second discharge passage, and the second housing member comprises the insertion hole, the second suction port, the second discharge port, a part of the second suction passage, and a part of the second discharge passage.

2. The pump device according to claim 1, wherein the second end surface of the second pump element is an end surface directed to the other end side opposite to the one end side in the axial direction, the second suction passage passes around the second pump element to communicate with the second suction port, and the second discharge passage passes around the second pump element to communicate with the second discharge port.

3. The pump device according to claim 2, wherein the inlet comprise a first inlet and a second inlet, the outlet comprise a first outlet and a second outlet, the first suction passage communicates from the first inlet to the first suction port, the first discharge passage communicates from the first discharge port to the first outlet, the second suction passage communicates from the second inlet to the second suction port, and the second discharge passage communicates from the second discharge port to the second outlet.

4. The pump device according to claim 1, wherein the inlet comprise a first inlet and a second inlet, the outlet comprise a first outlet and a second outlet, the first suction passage communicates from the first inlet to the first suction port, the first discharge passage communicates from the first discharge port to the first outlet, the second suction passage communicates from the second inlet to the second suction port, and the second discharge passage communicates from the second discharge port to the second outlet.

5. The pump device according to claim 1, wherein the passage member comprises the first suction port, the first discharge port, a part of the first suction passage, a part of the first discharge passage, a part of the second suction passage, and a part of the second discharge passage.

6. The pump device according to claim 1, wherein the intervening member comprises a part of the first suction passage and a part of the first discharge passage.

7. The pump device according to claim 1, wherein the first housing member and the second housing member are formed into bottomed cylindrical shapes having the same outer diameter and defining the insertion hole.

8. The pump device according to claim 7, wherein the first pump element and the second pump element have the same shape.

9. The pump device according to claim 1, wherein the first pump element comprises a first inner rotor that rotates around the axis, and a first outer rotor that rotates around a first biased axis which is parallel to the axis in conjunction with the first inner rotor, and the second pump element comprises a second inner rotor that rotates around the axis, and a second outer rotor that rotates around a second biased axis which is parallel to the axis in conjunction with the second inner rotor.

10. The pump device according to claim 9, wherein the first biased axis and the second biased axis are arranged 180 degrees apart around the axis.

* * * * *